(12) United States Patent
Walton et al.

(10) Patent No.: US 8,289,458 B2
(45) Date of Patent: Oct. 16, 2012

(54) DISPLAY

(75) Inventors: Emma Jayne Walton, Oxford (GB); Adrian Marc Simon Jacobs, Reading (GB); Heather Ann Stevenson, Oxford (GB); Paul A. Gass, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 1231 days.

(21) Appl. No.: 11/914,998

(22) PCT Filed: May 19, 2006

(86) PCT No.: PCT/JP2006/310506
§ 371 (c)(1),
(2), (4) Date: Mar. 27, 2008

(87) PCT Pub. No.: WO2006/126659
PCT Pub. Date: Nov. 30, 2006

(65) Prior Publication Data
US 2009/0102990 A1     Apr. 23, 2009

(30) Foreign Application Priority Data

May 21, 2005   (GB) .................................. 0510422.9

(51) Int. Cl.
*G02F 1/1335* (2006.01)
(52) U.S. Cl. .......................................................... 349/15
(58) Field of Classification Search ........................ None
See application file for complete search history.

(56) References Cited

U.S. PATENT DOCUMENTS

| | | |
|---|---|---|
| 2,053,173 A | 9/1936 | Astima |
| 2,689,387 A | 9/1954 | Carr |
| 3,031,351 A | 4/1962 | McIlvaine |
| RE27,617 E | 4/1973 | Olsen |
| 4,764,410 A | 8/1988 | Grzywinski |
| 4,766,023 A | 8/1988 | Lu |
| 5,147,716 A | 9/1992 | Bellus |
| 5,528,319 A | 6/1996 | Austin |
| 5,825,436 A | 10/1998 | Knight |
| 5,831,698 A | 11/1998 | Depp et al. |
| 5,877,829 A | 3/1999 | Okamoto et al. |
| 6,211,930 B1 | 4/2001 | Sautter et al. |

(Continued)

FOREIGN PATENT DOCUMENTS

GB      2 405 516 A      3/2005

(Continued)

OTHER PUBLICATIONS

Official communication issued in the International Application No. PCT/JP2006/310506, mailed on Aug. 22, 2006.

(Continued)

*Primary Examiner* — Thanh-Nhan P Nguyen
(74) *Attorney, Agent, or Firm* — Keating & Bennett, LLP

(57) ABSTRACT

A display is switchable between a first display mode with a first viewing angle range, a second display mode having a second viewing angle range smaller than the first viewing angle range and a multiple view directional display mode. The display includes an image display layer and a control element that is switchable between a first state in which it cooperates with the image display layer to provide the first display mode, a second state in which it cooperates with the image display layer to provide the second display mode, and a third state in which it cooperates with the image display layer to provide the multiple view directional display mode.

24 Claims, 16 Drawing Sheets

U.S. PATENT DOCUMENTS

| | | |
|---|---|---|
| 6,552,850 B1 * | 4/2003 | Dudasik .................. 359/486.02 |
| 6,724,450 B1 * | 4/2004 | Knoll et al. ................... 349/129 |
| 2001/0015782 A1 | 8/2001 | Takato et al. |
| 2002/0158967 A1 | 10/2002 | Janick et al. |
| 2002/0180922 A1 | 12/2002 | Takato et al. |
| 2004/0100604 A1 | 5/2004 | Takato et al. |
| 2005/0243265 A1 | 11/2005 | Winlow et al. |

FOREIGN PATENT DOCUMENTS

| | | |
|---|---|---|
| GB | 2 405 517 A | 3/2005 |
| GB | 2 405 518 A | 3/2005 |
| GB | 2 405 544 A | 3/2005 |
| GB | 2 410 116 A | 7/2005 |
| GB | 2 413 394 A | 10/2005 |
| JP | 2001-21892 A | 1/2001 |
| JP | 2005-78080 A | 3/2005 |
| JP | 2005-78093 A | 3/2005 |
| JP | 2005-107306 A | 4/2005 |

OTHER PUBLICATIONS

Official communication issued in the counterpart Application No. GB0510422.9, mailed on Aug. 15, 2005.

* cited by examiner

F I G. 3A
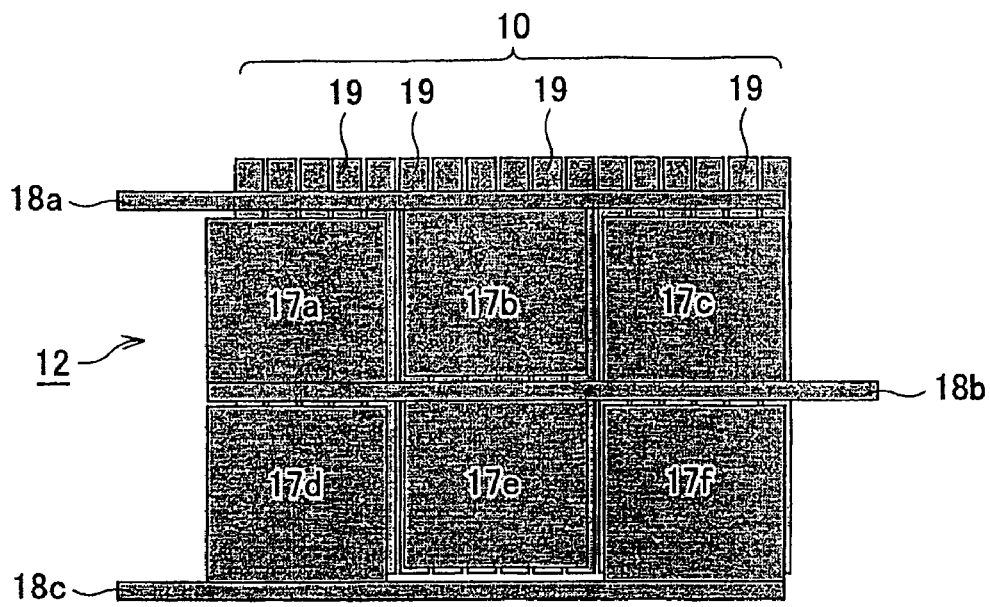
F I G. 3B
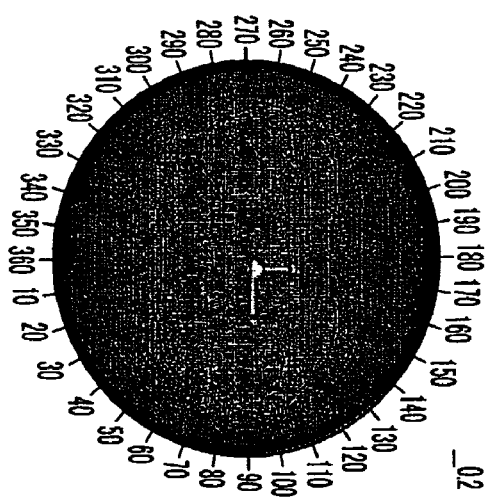
F I G. 3C
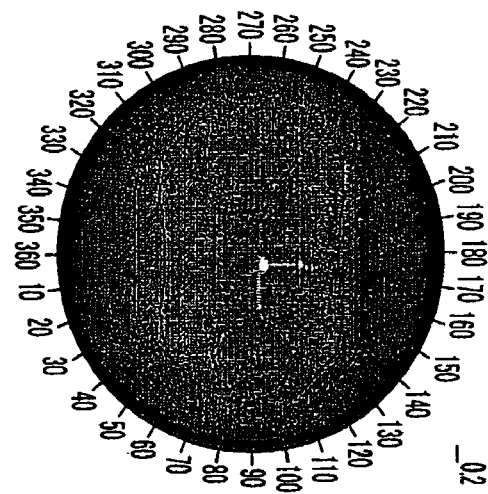

Privacy (checkerboard confusion) pattern 3D pattern

Privacy (checkerboard confusion) pattern

Patterned TN

Patterned electrodes 10
(Alternating voltage
e.g. 0V and 5V)

DISPLAY

BACKGROUND OF THE INVENTION

1. Field of the Invention

The present invention relates to a display in which the angular output range of light is controllable so that the display can be switched between a wide angle viewing mode and a narrow angle viewing mode, and which can further be switched to a multiple view directional display mode.

2. Description of the Related Art

Electronic display devices such as, for example, monitors used with computers and screens built in to mobile telephones and other portable information devices, are usually designed to have as wide a viewing angle as possible, so that an image displayed by the device can be seen from many different viewing positions. However, there are some situations where it is desirable for an image displayed by a device to be visible from only a narrow range of viewing angles. For example, a person using a portable computer in a crowded train might want the display screen of the computer to have a small viewing angle so that a document displayed on the computer screen cannot be read by other passengers on the train. For this reason, there has been considerable effort put in to developing display devices which are electrically switchable between two modes of operation—in a 'public' display mode they have a wide viewing angle for general use, but they can be switched to a 'private' display mode in which they have a narrow viewing angle so that private information can be displayed in public places without being visible to people other than the user of the device.

Another application of such a display may be as a display in a motor vehicle. The viewing angle of the display could be controlled such that the passengers are unable to see the display or such that the driver is unable to see the display. Alternatively, the viewing angle could be controlled in order to reduce the reflections of the display in the windscreen and the windows—so that, for example, the viewing angle could be reduced at night-time or in low light conditions. A brightness sensor could be provided to allow automatic switching between a wide viewing angle and a narrow viewing angle, and also to allow automatic control of the brightness of the display.

Displays are also known which display two or more images simultaneously, with each image being displayed in a different direction from the other image, and such displays are known as multiple view directional displays. The images may be still images or moving images (i.e., a sequence of images).

One type of a multiple view directional display is an autostereoscopic 3-D display, which displays two images that are the left eye image and right eye image of a stereoscopic image pair. The two images are displayed such that the left eye image is directed to the left eye of an observer and the right eye image is directed to the right eye of an observer, whereby the observer perceives a full 3-D image.

Another type of a multiple view directional display is a dual view display. A dual view displays two (or more) images, such that one image is directed to one observer and another image is directed to another observer. The images are independent from one another, and may be completely unrelated to one another such that the two observers see completely different images.

A number of devices are known which restrict the range of angles or positions from which a display can be viewed.

U.S. Pat. No. 6,552,850 describes a method for the display of private information on an automatic teller machine (ATM). Light emitted by the machine's display has a fixed polarization state, and the machine and its user are surrounded by a large screen of sheet polarizer which absorbs light of that polarization state but transmits light of the orthogonal polarization state. Passers-by can see the user and the machine, but cannot see information displayed on the machine's screen.

One known element for controlling the direction of light is a 'louvered' film that consists of alternating transparent layers and opaque layers provided in an arrangement similar to a Venetian blind. Such a film is shown schematically in FIG. 1. The film operates on the same principle as a Venetian blind, and it allows light to pass through it when the light is traveling in a direction parallel to, or nearly parallel to, the opaque layers, as shown by ray 30 in FIG. 1. However, light traveling at large angles relative to the plane of the opaque layers is incident on one of the opaque layers and is absorbed, as shown by ray 31 in FIG. 1. The layers may be perpendicular to the surface of the film, as shown in FIG. 1, or they may be arranged at some other angle relative to the surface of the film.

Louvered films of this type may be manufactured by stacking many alternating sheets of transparent material and opaque material and then cutting slices of the resulting block perpendicular to the layers. This method has been known for many years and is described in, for example, U.S. Pat. Nos. 2,053,173; 2,689,387 and 3,031,351.

Other manufacturing methods are known. For example, U.S. Pat. No. RE27,617 describes a process where a louvered film is cut continuously from a cylindrical billet of stacked layers. U.S. Pat. No. 4,766,023 describes how the optical quality and mechanical robustness of the resulting film can be improved by coating with a UV-curable monomer and then exposing the film to UV radiation. U.S. Pat. No. 4,764,410 describes a similar process where a UV-curable material is used to bond the louver sheet to a covering film.

Other methods exist for making films with similar properties to the louvered film. For example, U.S. Pat. No. 5,147,716 describes a light-control film which contains many elongated particles which are aligned in the direction perpendicular to the plane of the film. Light rays which make large angles to this direction are therefore strongly absorbed, whereas light rays propagating in this direction are transmitted.

Another example of a light-control film is described in U.S. Pat. No. 5,528,319. This film has a transparent body in which are embedded opaque regions that extend generally parallel to the plane of the film. The opaque regions are arranged in stacks, with each stack being spaced from a neighboring stack. The opaque regions block the transmission of light through the film in certain directions while allowing the transmission of light in other directions.

The prior art light control films may be placed either in front of a display panel or between a transmissive display panel and its backlight, to restrict the range of angles from which the display can be viewed. In other words, the prior art light control films make a display 'private'. However, none of the prior art light control films enables the privacy function to be switched off to allow viewing from a wide range of angles.

There have been reports of a display which can be switched between a public mode (with a wide viewing angle) and a private mode (with a narrow viewing angle). For example, U.S. Patent Publication No. 2002/0158967 suggests that a light control film could be movably mounted on a display so that the light control film either may be positioned over the front of the display to provide a private mode or may be mechanically retracted into a holder behind or beside the display to provide a public mode. This method has the disadvantage that it contains moving parts which may fail or be damaged in use, and which add bulk to the display.

A method for switching a display panel from public to private mode with no moving parts is to mount a light control film behind the display panel, and to place a diffuser which can be electronically switched on and off between the light control film and the panel. When the diffuser is inactive, the light control film restricts the range of viewing angles and the display is in a private mode. When the diffuser is switched on, the light with a narrow angle range output from the light control film is incident on the diffuser, and the diffuser acts to increase the angular spread of the light—that is, the diffuser cancels out the effect of the light control film. Thus, the display is illuminated by light traveling at a wide range of angles and the display operates in a public mode. It is also possible to mount the light control film in front of the panel and place the switchable diffuser in front of the light control film to achieve the same effect.

Switchable privacy devices of the above type are described in U.S. Pat. Nos. 5,831,698; 6,211,930; and 5,877,829. They have the disadvantage that the light control film always absorbs a significant fraction of the light incident upon it, whether the display is in public mode or private mode. The display is therefore inherently inefficient in its use of light. Furthermore, since the diffuser spreads light through a wide range of angles in the public mode, these displays are also dimmer in public mode than in private mode (unless the backlight is made brighter when the device is operating in public mode to compensate).

Another disadvantage of these devices relates to their power consumption. Such devices often use a switchable polymer-dispersed liquid crystal diffuser which is not diffusive when no voltage is applied across the liquid crystal layer and which is switched on (into the diffusive state) by applying a voltage. Thus, to obtain the public mode of operation it is necessary to apply a voltage across the diffuser so that the diffuser is switched on. More electrical power is therefore consumed in the public mode than in the private mode. This is a disadvantage for mobile devices which are used for most of the time in the public mode and which have limited battery power.

Another method for making a switchable public/private display is described in U.S. Pat. No. 5,825,436. The light control device in this patent is similar in structure to the louvered film described above. However, each opaque element in a conventional louvered film is replaced by a liquid crystal cell which can be electronically switched from an opaque state to a transparent state. The light control device is placed in front of or behind a display panel. When the cells are opaque, the display operates in a private mode; when the cells are transparent, the display operates in a public mode.

One significant disadvantage of this device is the difficulty and expense of manufacturing liquid crystal cells with an appropriate shape. A second disadvantage is that, in the private mode, a ray of light may enter at an angle such that it passes first through the transparent material and then through part of a liquid crystal cell. Such a ray will not be completely absorbed by the liquid crystal cell and this may reduce the privacy of the device.

Japanese Patent Publication No. 2003-233074 describes a display having a switchable viewing angle. This uses an additional LC panel, which is segmented. Different segments of the additional LC panel modify the viewing characteristics of the associated areas of the display in different ways, with the result that the whole display panel is fully readable only from a central viewing position.

U.K. Patent Application No. 0320363.5 describes switchable privacy devices based on louvers, which operate only for one polarization of light. The louvers are switched on and off either by rotating dyed liquid crystal molecules in the louver itself or by rotating the plane of polarization of the incident light using a separate element.

U.K. Patent Application No. 0408742.5 describes a switchable privacy device constructed by adding one or more extra liquid crystal layers and polarizers to a display panel. The intrinsic viewing angle dependence of these extra elements can be changed by switching the liquid crystal electrically in the well-known way.

U.K. Patent Application No. 0401062.5 describes a display that is switched between a public mode and a private mode by using two different backlights which generate light with different angular ranges.

GB 2 410 116, which was published after the priority date of this application, relates to a display device that is switchable between a public display mode and a private display mode. This is achieved by providing two backlights with different angular output ranges, and selecting the narrow output backlight to obtain a private display mode or selecting the wide output backlight to obtain a public display mode. In one embodiment, the backlight is formed of two inter-digitated illumination systems, with each illumination system being illuminated either by a visible light source or by a UV light source. Each illumination system includes a phosphor sheet, and so emits visible light with a wide angular range when the respective UV light source is illuminated. If the visible light source is illuminated, however, the illumination system emits light with a narrow angular range. The backlight can therefore operate in various modes—(1) if both visible light sources are illuminated it emits visible light with a narrow angular range over its entire area; (2) if both UV sources are illuminated, it emits visible light with a wide angular range over its entire area; (3) if just one visible [or UV] source is illuminated, it emits visible light with a narrow [wide] angular distribution over the area corresponding to one of the inter-digitated illumination systems.

GB 2 405 544 is directed to a polarization-dependent light control structure in which the light control structure is arranged to act as a parallax barrier for light having a particular plane of polarization. Depending on the state of a switchable half-wave plate, the light control structure may be rendered ineffective, thus providing a public 2-D mode or it may act as a parallax barrier thereby providing a 3-D display mode. Furthermore, if the half-wave plate is switched so that the light control structure is enabled, a private 2-D display mode may be obtained by displaying a single image on the display panel.

SUMMARY OF THE INVENTION

In order to overcome the problems described above, preferred embodiments of the present invention provide a display switchable between a first display mode having a first viewing angle range, a second display mode having a second viewing angle range smaller than the first viewing angle range and a multiple view directional display mode, wherein the display includes an image display layer and a control element, the control element being switchable between a first state in which it cooperates with the image display layer to provide the first display mode, a second state in which it cooperates with the image display layer to provide the second display mode, and a third state in which it cooperates with the image display layer to provide the multiple view directional display mode. Such a display is more flexible in use than known displays. Not only does such a display have the advantages of conventional displays that are switchable between a public mode and a private mode, but it also may be switched to provide a multiple view directional display mode such as a 3-D mode or a dual view mode.

If a display according to a preferred embodiment of the present invention is installed in a motor vehicle, for example, it may be used in a wide display mode in which a displayed image is visible to the driver and to passengers, in a narrow view mode in which a displayed image is visible only to passengers (or only to the driver), and a dual view mode in which one image (such as a road map) is displayed to the driver and another image (such as an entertainment program) is displayed to passengers.

Preferred embodiments of the present invention may also be applicable to displays in mobile devices such as mobile telephones, to provide such devices with a private display mode and a 3-D display mode. Selection of a desired display mode is effected by switching the control element appropriately, and it is not necessary to, for example, switch from one backlight to another as in GB 2 410 116 nor to reconfigure an image displayed on the image display layer as in GB 2 405 544.

The control element preferably may include a layer of electro-optical material.

The control element may further include at least one patterned electrode for addressing the layer of electro-optical material and a controller for addressing the at least one electrode thereby to put the control element into a desired one of the first state, the second state and the third state.

The control element may include a first set of patterned electrodes disposed on a first side of the layer of electro-optical material and a second set of patterned electrodes disposed on a second side of the layer of electro-optical material.

The first set of patterned electrodes may be addressable to define a first image in the electro-optical layer visible at viewing angles outside the second viewing angle range and not visible at viewing angles inside the second viewing angle range. Alternatively, the first and second sets of patterned electrodes may be addressable to co-operate to define a first image in the electro-optical layer visible at viewing angles outside the second viewing angle range and not visible at viewing angles inside the second viewing angle range. An observer viewing the display along a direction outside the second viewing angle range sees a superposition of an image displayed on the image display layer and the image defined in the electro-optical layer of the control element. The image defined in the electro-optical layer of the control element acts as an "obscuring image", so that the observer has difficulty in making out the image displayed on the image display layer. An observer viewing the display along the axis normal to the display surface of the display, however, sees only an image displayed on the image display layer.

Typically, the second viewing angle range includes, and is often centered on, the normal to the display surface of the display.

The display may further include an optical retarder disposed in the path of light through the control element.

The control element may include at least one patterned alignment surface for aligning the electro-optical layer. It may include a set of patterned electrodes disposed on one side of the layer of electro-optical material.

The electro-optical layer may be addressable to define a first image in the electro-optical layer visible at viewing angles outside the second viewing angle range and not visible at viewing angles inside the second viewing angle range. In this preferred embodiment, the "obscuring image" arises as a result of the patterning of the patterned alignment surface, which defines regions of different optical properties in the layer of electro-optical material.

The second set of patterned electrodes, or the set of patterned electrodes, may be addressable to selectively define a parallax optic in the electro-optical layer. This provides a multiple view directional display mode.

The first image may be selected dependent on a second image to be displayed by the image display layer.

The layer of electro-optical material may include a first layer of liquid crystal material.

The liquid crystal material may be in a partially switched state when the control element is in the second state.

The liquid crystal material may be a nematic liquid crystal material in a Freedericksz alignment, or it may be a vertically aligned nematic liquid crystal material.

The image display layer may include a second layer of liquid crystal material.

The multiple view mode may be a 3-D display mode, or it may be a dual view display mode.

The second viewing angle range may be within the first viewing angle range.

The second viewing angle range may include the normal direction.

The second viewing angle range may have a bisector which is non-normal to the display.

The display may be arranged to display an indication when the display is in the second display mode.

The display may be arranged to adopt the second display mode in response to the content of data for display.

The display may include an ambient light sensor for causing the display to adopt the second display mode when the ambient light is below a threshold.

The display may comprise a vehicle display.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIGS. 3A to 3C illustrate a wide display mode of the display of FIG. 2A.

DETAILED DESCRIPTION OF THE PREFERRED EMBODIMENTS

Figure 1:
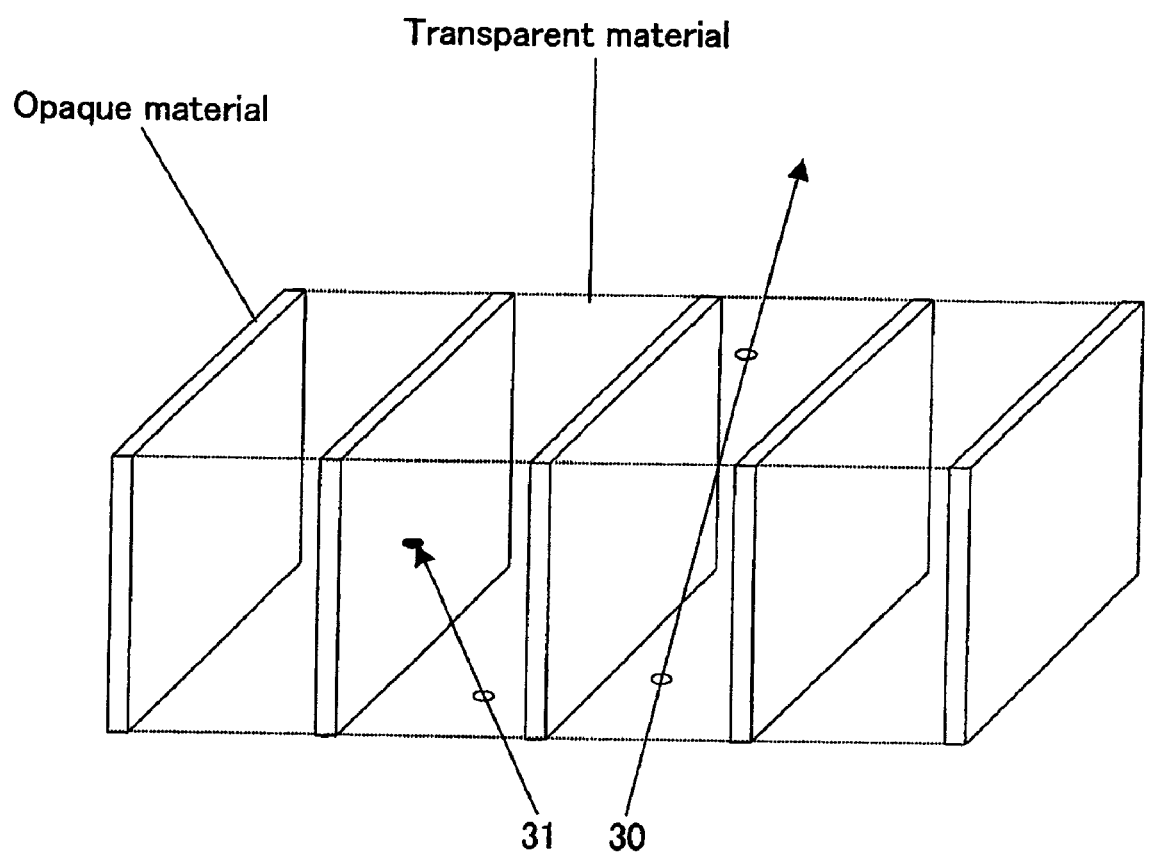
FIG. 1 is a schematic sectional view of a prior art louver structure.

Like reference numerals denote like components throughout the drawings.

The present invention will be described with reference to a display switchable to an autostereoscopic 3-D display mode as the multiple view directional display mode, as an example. The present invention is not, however, limited to this mode, and the multiple view directional display mode may be, for example, a dual view display mode.

Figure 2A:
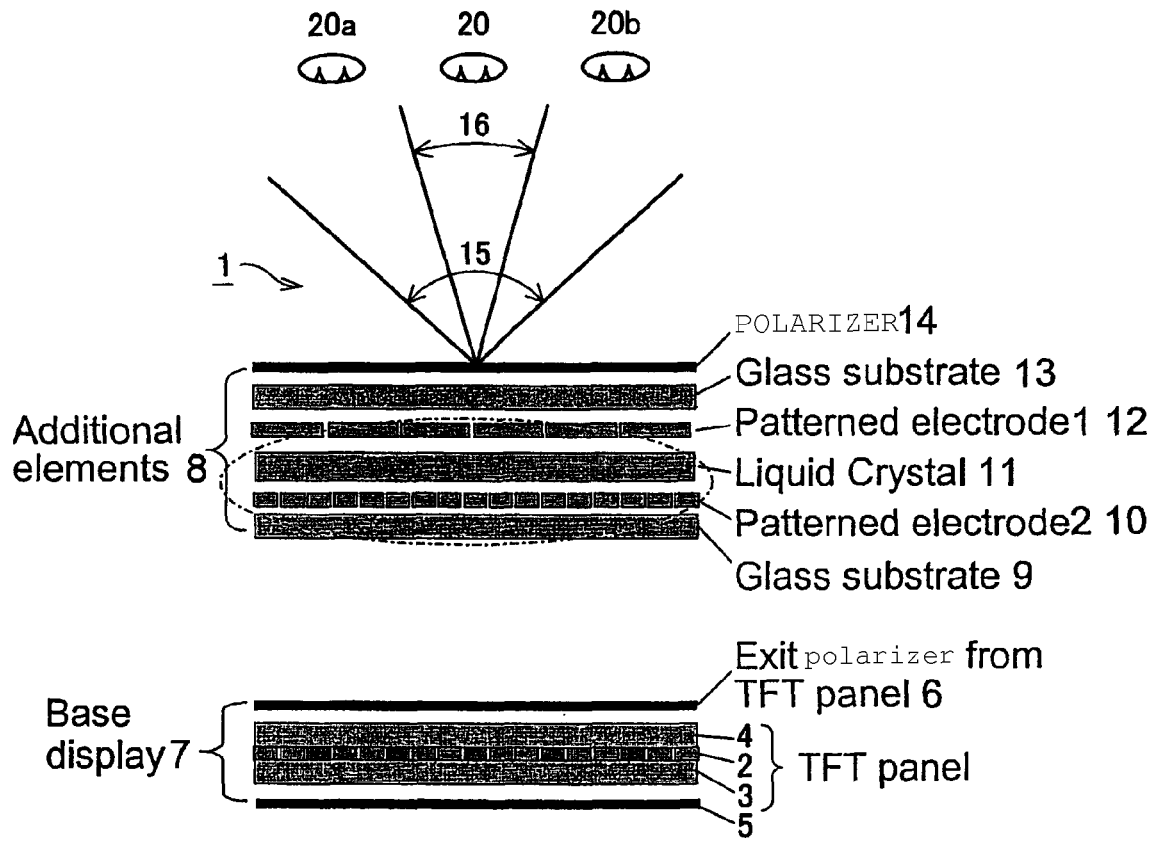
FIGS. 2A and 2B are a sectional plan view and a perspective view illustrating a display according to a first preferred embodiment of the present invention.

FIG. 2A is a schematic sectional plan view of a display 1 according to a first preferred embodiment of the present invention. The display 1 is switchable so as to operate in any of a wide viewing mode, a narrow viewing mode, and a 3-D display mode.

The display 1 preferably includes an image display layer 2 which can be driven to display a desired image. The image display layer 2 may be of a conventional type, which does not require any change in order to provide a display that is operable in more than one mode. For example, the image display layer 2 may be a liquid crystal layer, and in particular may be the liquid crystal layer of a thin film transistor (TFT) liquid crystal panel that provides a pixelated full color or monochrome display in response to image data supplied to the panel.

FIG. 2A shows the image display layer 2 disposed between first and second transparent substrates 3, 4. The image display layer 2 and the substrates 3, 4 are themselves disposed between an entrance polarizer 5 and an exit polarizer 6. The polarizers 5, 6, the substrates 3, 4 and the image display layer 2 together constitute an image display device 7.

In operation, the display is illuminated by a backlight (not shown) placed behind the image display device 7. The backlight emits light with reasonable uniformity of intensity throughout a relatively wide angular distribution range. The backlight may be of a conventional type as used to illuminate known displays.

Other components of the image display device 7 such as, for example, electrodes for addressing the image display layer 2, or alignment surfaces for aligning the image display layer (for example when the image display layer is a liquid crystal layer) have been omitted from FIG. 2A for clarity.

The display 1 further includes additional components 9-14 disposed in the path of light from the image display device 7 to an observer 20, 20a, 20b. The additional components 9-14 together define a control element 8. The control element 8 provides controllable angular light modulation and thereby enables the display mode of the display 1 to be varied. The control element 8 may, for example, change the output of the display 1 between a narrow angular light distribution 16 and a wide angular light distribution 15. The control element 8 may further be switched to provide a parallax barrier so that, when two or more images are displayed in appropriate manner on the image display layer 2, the control element 8 cooperates with the image display layer 2 to provide a multiple view directional display mode.

The control element 8 may alternatively be disposed between the backlight (not shown) and the image display device 7. In such an alternative configuration, the image display layer 7 rather than the control element 8 is closer to an observer 20, 20a, 20b.

The control element 8 includes a layer of electro-optical material 11. In the foregoing description, it will be assumed that the layer of electro-optical material 11 constitutes a liquid crystal layer, but the invention is not in principle limited to this. The liquid crystal layer 11 is disposed between third and fourth transparent substrates 9, 13, formed, for example, of glass. A first set of patterned electrodes 10 and a second set of patterned electrodes 12 are provided between the third and fourth glass substrates 9, 13, to enable to liquid crystal layer 11 to be addressed, and these electrodes will be described further below.

Finally, the control element 8 includes an exit polarizer 14.

Other components of the control element 8, such as a controller for applying voltages to the first and second sets of patterned electrodes or alignment surfaces for aligning the molecules of the liquid crystal layer 11 of the control element, are conventional, and have been omitted from FIG. 2A for clarity.

As explained above, the control element 8 may be controlled so as to control the display mode of the display 1. In one state of the control element, it has substantially no effect on the angular spread of light emitted from the display device 7, so that an image displayed by the display device 7 is visible over a wide viewing range 15 thereby providing the display 1 with a wide viewing mode. In another state of the control element, an image displayed by the display device 7 is visible only over a narrow viewing range 16 thereby providing the display 1 with a narrow viewing mode.

In the preferred embodiment of FIG. 2A, the narrow viewing range is obtained by the control element 8 creating an obscuring image that is visible at the viewing angles outside the narrow viewing range 16 but is not visible for viewing angles within the narrow viewing range 16. An observer 20 located within the narrow viewing angle range 16 thus sees only the image displayed on the image display layer 2, but an observer 20a, 20b viewing the display from outside the narrow viewing range 16 sees the superposition of the original image displayed on the image display layer 2 and the obscuring image generated by the control element 8.

Finally, the control element may be switched to a third state in which it cooperates with the image display layer to provide a multiple view directional display mode. In the preferred embodiment of FIG. 2A, the control element provides a parallax optic when switched to its third state so that, if two or more images are displayed on the image display layer 2 in an appropriate manner (for example, as interlaced images when the parallax optic has alternating transmissive and non-transmissive regions) a multiple view directional display mode is obtained.

Figure 2B:
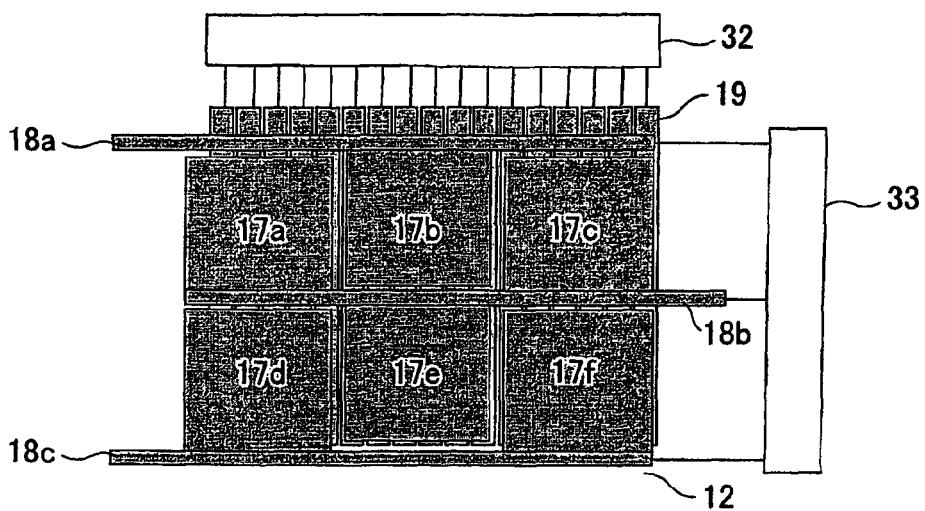

FIG. 2B is a perspective view of the control element 8, showing the first and second sets of patterned electrodes 10, 12. FIG. 2B shows the control element from the direction in which it would be viewed by an observer, so that the first set of patterned electrodes 12 are closer to the observer than the second set 10 of patterned electrodes. The liquid crystal layer 11, the substrates 9, 13 and the polarizer 14 have been omitted from FIG. 2B.

As is shown in FIG. 2B, the first set of patterned electrodes 12 includes an array of generally rectangular electrodes 17 (a)-17 (f). The electrodes are arranged in an array of rows and columns. The electrodes 17(a)-17(f) are addressed via addressing lines 18a-18c that allow the controller 33 to apply a desired voltage to the electrodes. However, the electrodes are connected to the addressing lines such that all electrodes in one row of electrodes are not connected to the same addressing line. Rather, each row of electrodes is arranged between two addressing lines, and the electrodes are connected alternately to the addressing line above the row of electrodes and the addressing line below the row of electrodes. Thus, in the first row of electrodes 17a-17c shown in FIG. 2B, the first and third electrodes 17a, 17c (and the fifth, seventh electrodes, etc.) are connected to the addressing line 18b below the first row of electrodes, and the second electrode 17b (and the fourth, sixth, etc. electrodes) are connected to the addressing line 18a above the row of electrodes. Similarly, in the lower row of electrodes 17e, 17f shown in FIG. 2B, the first and third electrodes 17d, 17f (and the fifth, seventh, etc. electrodes) are connected to the addressing line 18c below the row of electrodes whereas the second electrode 17e (and the fourth, sixth etc. electrodes) are connected to the addressing line 18b above that row of electrodes.

The second set of patterned electrodes 10 includes an array of stripe electrodes 19. These are arranged so that they extend substantially vertically when the display 1 is in its normal orientation. The strip electrodes 19 are again addressable via addressing lines that allow the controller 32 to apply a desired voltage.

FIG. 3A illustrates operation of the display in its wide viewing mode. FIG. 3A shows only the first and second patterned electrodes of the control element 8, and other components have been omitted for clarity. In the wide viewing mode, the optical control element 8 has substantially no effect on the angular range of light emitted by the display element 7. This can most conveniently be achieved by arranging the liquid crystal layer 11 of the control element to rotate the plane of polarization of light passing through it in the wide viewing mode, and for the exit polarizer of the control element to be arranged with its transmission axis at an angle to the transmission axis of the exit polarizer 6 of the display element 7. Preferably, in the wide viewing mode, the liquid crystal layer 11 of the control element rotates the plane of polarization of light passing through it by substantially 90°, and the exit polarizer of the control element has its transmission axis at about 90° relative to the transmission axis of the exit polarizer 6 of the display element 7. An image generated by the display device 7 is thus transmitted through the control element with little or no change. In an alternative configuration, the wide display mode may be obtained by arranging the exit polarizer of the control element with its transmission axis parallel to the transmission axis of the exit polarizer 6 of the display element 7, and by arranging the liquid crystal layer 11 of the control element to have substantially no effect on the plane of polarization of light passing through it. However, this alternative configuration may produce a less effective dark state.

In the wide viewing mode, the first and second sets of patterned electrodes 10, 12 are addressed such that the liquid crystal layer 11 of the control element has a uniform liquid crystal state over its entire area. This requires that a uniform electric field is applied over the entire area of the liquid crystal layer 11 of the control element 8, and this may be done by applying a first reference voltage to all electrodes 17a-17f of the first set of patterned electrodes and by applying a second reference voltage to all stripe electrodes 19 of the second set of patterned electrodes. One (or possibly both) of the first and second reference voltages may be zero.

The particular electric field that must be applied across the liquid crystal layer 11 of the control element to obtain the wide display mode will depend on the operating mode of the liquid crystal layer 11 of the control element 8. In some cases, zero electric field would be required to obtain the wide viewing mode, and in this case the same voltage would be applied to all of the electrodes 17a-17f and the stripe electrodes 19 in FIG. 3A (i.e., the first and second reference voltages would be equal to one another, and could both be zero). In practice it is not usual to apply a zero voltage to an electrode of a liquid crystal device, because of the nature of the drive electronic that are commonly used. Thus, a zero electric field is in practice normally obtained by the applying the same non-zero voltage to opposing electrodes.

The wide display mode is obtained when zero electric field is applied as described in the above paragraph if the liquid crystal layer 11 of the control element 8 includes, for example, a nematic liquid crystal in a Freedericksz alignment. In the Freedericksz alignment, the liquid crystal molecules lie substantially in the plane of the substrate when zero electric field is applied across the liquid crystal layer. The liquid crystal layer is preferably disposed between crossed linear polarizers, with the liquid crystal molecules orientated at an angle of 45° relative to the transmission axis of each polarizer so that the liquid crystal layer acts effectively as a half-wave plate that rotates the polarization of light by 90°. The result is that display is transmissive at zero applied electric field (a "normally white mode"). When a sufficiently large electric field is applied (typically requiring an applied voltage of around 5V rms across a typical thickness of liquid crystal), the liquid crystal molecules are re-oriented to a perpendicular alignment in which they are substantially orthogonal to the plane of the substrate and so have no effect on the polarization of light passing through the layer. This produces a black state. At some intermediate applied electric field (typically requiring an applied voltage of around 2.5V rms across a typical thickness of liquid crystal), the liquid crystal molecules adopt an intermediate state in which they are partially switched up to the perpendicular alignment. This is a very asymmetric configuration.

Alternatively, a uniform electric field may be required across the liquid crystal layer 11 to obtain the wide viewing mode of the display 1. This would be the case if the liquid crystal layer 11 of the control element 8 includes a nematic liquid crystal material in a vertically aligned nematic (VAN) configuration, for example. A VAN mode liquid crystal layer is switchable between the same states as described above for a Freedericksz mode nematic liquid crystal, but the liquid crystal molecules adopt the alignment perpendicular to the plane of the substrate in zero applied field (thus giving a "normally black" mode if the liquid crystal is disposed between crossed linear polarizers). When a sufficiently large electric field is applied (typically requiring an applied voltage of around 5V rms across a typical thickness of liquid crystal), the liquid crystal molecules are re-oriented to be parallel to the plane of the substrates and, provided the molecules are substantially at 45° relative to the transmission axes of the two polarizers, the liquid crystal layers acts as a half-wave plate and a bright state is obtained. As in the case of the Freedericksz mode, at some intermediate applied electric field, the liquid crystal molecules adopt an intermediate state in which they are partially switched to the perpendicular alignment.

FIG. 3B shows a plot for the transmissivity of the control element in its wide viewing mode. The center of the plot (which is marked by a white circle) corresponds to an observer viewing the display along its normal axis, and moving left or right from the center corresponds to a change in azimuth angle. Similarly, moving up or down from the center corresponds to a change in the polar angle. The transmissivity for a particular viewing angle is denoted both by contour lines and by shading. FIG. 3B covers an azimuth angular range of 360° and an angular range of 90° in the vertical direction (from an in-plane direction to the normal direction).

FIG. 3B is the plot for the transmissivity of the control element for the region of the control corresponding to the electrode 17d of the first set of patterned electrodes. FIG. 3C shows a similar transmissivity plot, but for the region of the control element corresponding to the adjacent electrode 17e of the first set of patterned electrodes. As can be seen, both regions of the control element have a high transmissivity, even at viewing angles well away from the normal axis of the display. This shows that the display 1 has a wide viewing mode, since the control element will have little or no effect on an image displayed by the display device 7 and the image is visible through the wide angular range 15 of FIG. 2A. All observers 20, 20a, 20b will see an image displayed on the image display layer 2, and the display has a wide display mode.

Figure 4A:
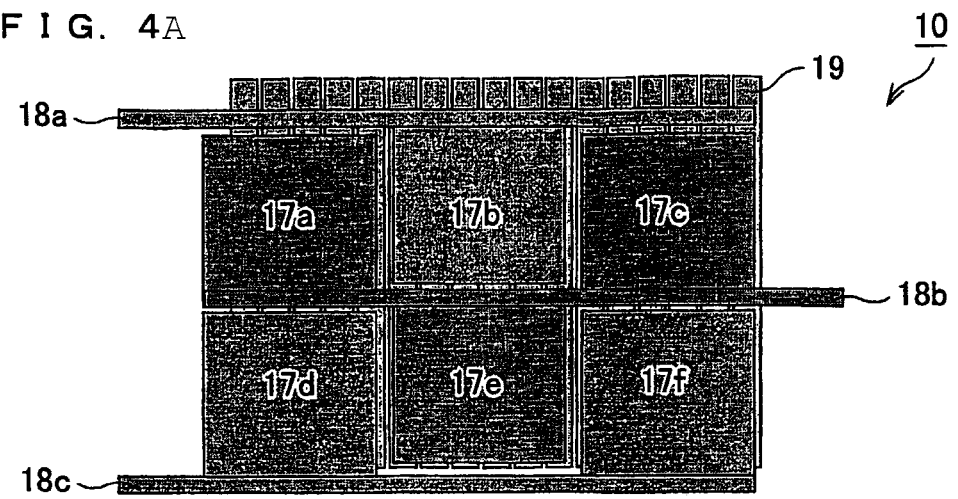
FIGS. 4A to 4D illustrate a narrow viewing mode of the display of FIG. 2A.

FIG. 4A corresponds to FIG. 2B and shows the display in its narrow view mode. Again, FIG. 4A shows only the first and second patterned electrodes of the control element 8, and other components have been omitted for clarity.

To obtain the narrow view mode, an electric field of non-uniform strength is applied across the liquid crystal layer of the control element 8, so that some regions of the liquid crystal layer of the control element 8 experience a first electric field strength whereas other regions of the liquid crystal layer of the control element 8 experience a second, different electric field strength. For ease of implementation, one of the first or second electric fields is preferably zero. As a result, the liquid crystal layer 11 does not have a uniform liquid crystal state over its entire area, and so the optical properties of the liquid crystal layer vary over its area.

In the preferred embodiment of FIG. 4A, a non-zero voltage is applied to alternate ones of the addressing lines 18a-18c for the first patterned electrodes 17a-17f. In FIG. 4A, a first, non-zero voltage has been applied to the second addressing line 18b (and to the fourth, sixth, etc. addressing lines), whereas a second voltage (different from the first voltage and preferably non-zero) is applied to the first and third addressing lines 18a, 18c (and the fifth, seventh, etc. addressing lines) and to all of the stripe electrodes 19 of the second set of patterned electrodes. The first voltage is therefore applied to the first and third electrodes 17a, 17c of the first row, and to the second electrode 17e of the second row, so that an electric field is applied across the corresponding regions of the liquid crystal layer 11 of the optical control element. A zero electric field is applied across other regions of the liquid crystal layer 11 of the optical control element. The first and second voltages are set such that one liquid crystal state exists in the regions of the liquid crystal layer 11 corresponding to the first and third electrodes 17a, 17c of the first row and to the second electrode 17e of the second row, and a different liquid crystal state, having different optical properties, exists in the regions of the liquid crystal layer 11 corresponding to the other electrodes 17b, 17d, 17f. The first patterned electrodes 17a-17f thus act as a patterned counter electrode that can obtain a narrow display mode.

Figure 4B:
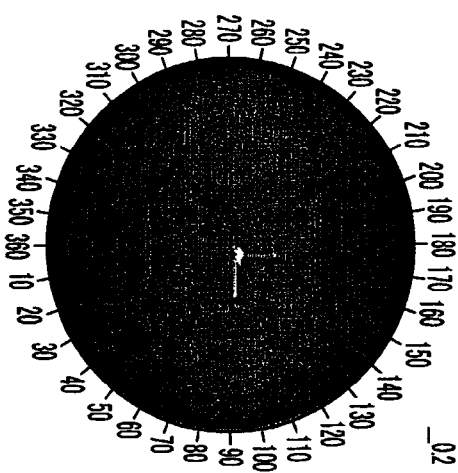
Figure 4C:
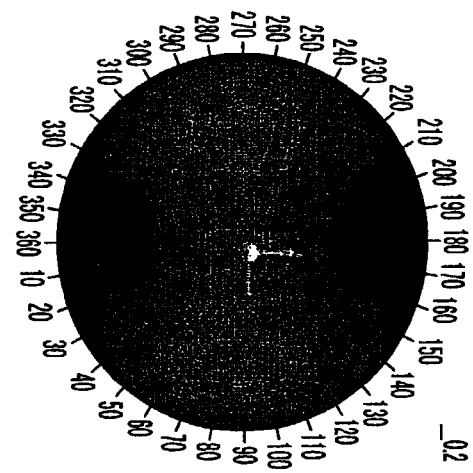

FIG. 4A is appropriate for the case where the liquid crystal layer 11 of the control element 8 is a nematic liquid crystal material having a Freedericksz alignment. In this case, regions of the liquid crystal layer 11 corresponding to those electrodes to which the second voltage is applied—the second electrode 17b of the first row of electrodes, and the first and third electrodes 17d, 17f of the second row of electrodes—have the same optical properties as in FIG. 3A, as shown by the transmissivity plot of FIG. 4B. However, in regions of the liquid crystal layer corresponding to those electrodes to which the first voltage is applied, the liquid crystal state is changed to the partially switched alignment as a result of the applied electric field set up across those regions. As a result, these regions of liquid crystal produce a variation of intensity upon viewing angle. This is shown by the transmissivity plot of FIG. 4C. As can be seen in this Figure, the intensity is high only for viewing angles near the normal direction. As the observer moves away from normal viewing direction, in a horizontal plane, the intensity quickly decreases.

Thus, an observer who views the display along its normal axis, or at a viewing angle close to the normal axis, will see an image displayed on the image display device 7. All regions of the control element 8 have a high transmissivity when viewed along the normal axis, and all regions of the control element 8 have substantially the same transmissivity as one another when viewed along the normal axis, so the control element 8 has no effect on the image seen by an observer viewing the display along its normal axis or along a direction close to the normal axis.

However, an observer who views the display at a wide viewing angle will see a "confusing image" generated by the control element, as a consequence of the substantial difference in transmissivity, at high viewing angles, between the regions of the control element corresponding to the electrodes 17a, 17c and 17e and the regions of the control element corresponding to the electrodes 17b, 17d and 17f. An observer 20a, 20b outside the narrow angular range 16 sees the "confusing image" superposed over the image displayed on the image display layer 2, and is thus unable to easily make out the image displayed on the image display layer 2.

Figure 4D:
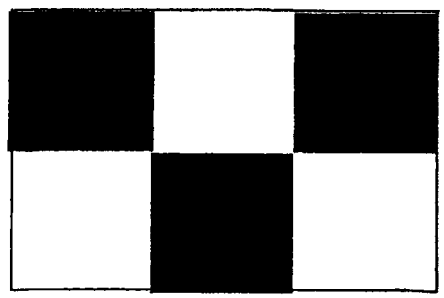

If the first set of patterned electrodes is arranged and operated as shown in FIG. 4A, the "confusing image" visible at high viewing angles is a checkerboard pattern as shown in FIG. 4D. The checkerboard pattern makes it difficult for the observer to make out the image displayed on the image display panel.

The liquid crystal state in the regions of the liquid crystal layer 11 of the control element corresponding the electrodes 17a, 17c, 17e should provides a high transmissivity for light propagating along or close to the normal axis but a low transmissivity for light propagating a large angles to the normal axis. The partially switched alignment of a Freedericksz mode nematic liquid crystal or a VAN liquid crystal is suitable for this. Such effects are described in more detail in co-pending UK Patent Application No. 0408742.5 and the corresponding European Patent Application No. 05103193.8.

It should be noted that the details of the addressing of the first set of patterned electrodes will depend on the nature of the liquid crystal layer 11 of the control element 8. While the addressing scheme described above will be appropriate for a nematic liquid crystal having the Freedericksz configuration, liquid crystal layers having other liquid crystal alignments may require addressing in a different way. For example, in the case of a nematic liquid crystal material having a vertically aligned nematic alignment, the wide view mode is obtained by applying a uniform non-zero electric field across the liquid crystal layer to orient the liquid crystal molecules parallel to the substrates and at 45° relative to the transmission axes of the substrates. In this case, the narrow view mode would again be obtained by addressing the liquid crystal layer using alternate ones of the addressing lines 18a, 18b, 18c. An electric field high enough to obtain the parallel alignment of the liquid crystal molecules would be applied to some liquid crystal regions, and these regions would have a high transmissivity over a wide range of viewing angles. Other liquid crystal regions would have an intermediate electric field applied across them, so that the molecules would adopt the partially switched state and so would have a low transmissivity at high viewing angles.

Figure 5A:
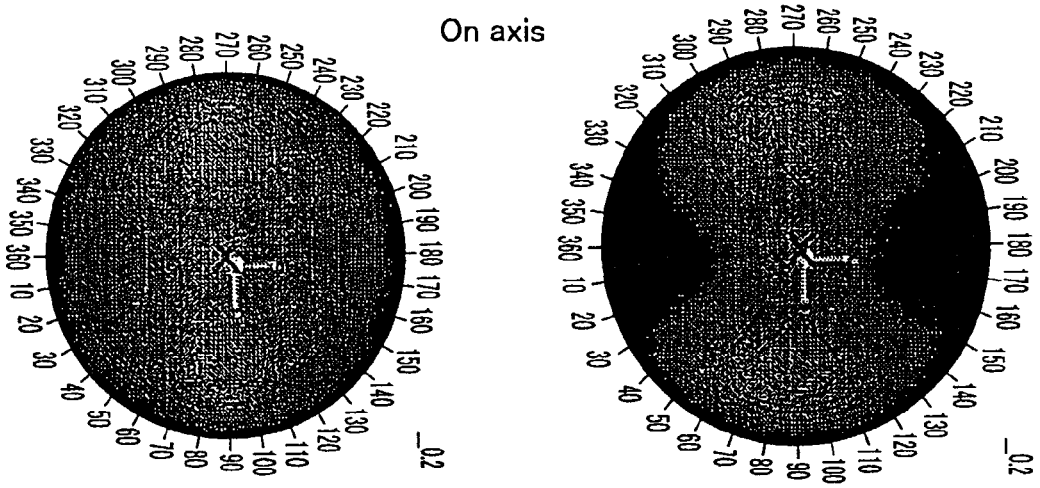
FIGS. 5A to 5C further illustrate the narrow viewing mode of the display of FIG. 2A.
Figure 5B:
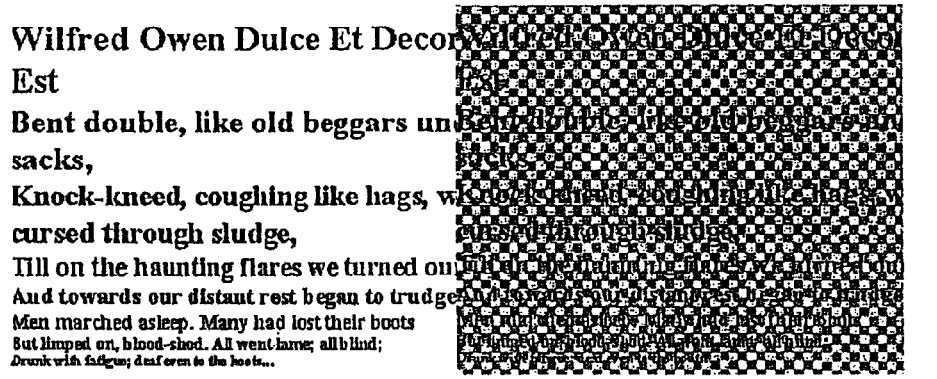
Figure 5C:
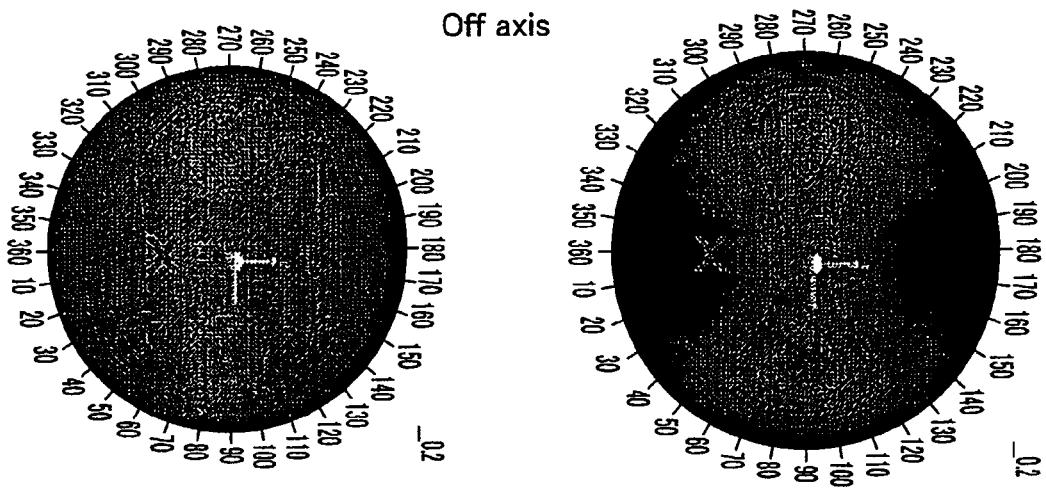

FIGS. 5A to 5C illustrate the narrow display mode of the display 1 in more detail. FIG. 5A shows plots of the transmissivity of the control element 8 for an observer viewing the display along its normal axis, with the position of the observer being indicated by a "X" in the transmissivity plots. The left hand transmissivity plot is for a region of the control element 8 corresponding to the electrode 17d in FIG. 4A, and the right hand transmissivity plot is for a region of the control element 8 corresponding to the electrode 17e in FIG. 4A. As can be seen, for an observer viewing the display along its normal axis, all regions of the liquid crystal layer 11 of the control element 8 have high transmissivity, and have substantially the same transmissivity as one another. The "obscuring image" generated by the control element 8 is not visible to the observer viewing the display along its normal axis. As a result, the observer sees only the image displayed on the image display layer 2, as represented in the left hand portion of FIG. 5B, which is a representation of the view seen by an observer, and the image displayed on the image display layer 2 is thus seen clearly.

FIG. 5C shows plots of the transmissivity of the control element 8 for an observer viewing the display from a position that is laterally displaced from the normal axis. The position of the observer is again indicated in the intensity plots of FIG. 5C by an "X". The left hand transmissivity plot is for a region of the control element 8 corresponding to the electrode 17d in FIG. 4A, and the right hand transmissivity plot is for a region of the control element 8 corresponding to the electrode 17e in FIG. 4A. It can now be seen the regions of the control element do not have the same transmissivity as one another, so that the observer will perceive a superposition of the "obscuring pattern" created by the control element 8 and the original image displayed on the image display layer 2. This is illustrated in the right hand portion of FIG. 5B, and it can be seen that the obscuring pattern (the checkerboard pattern in this preferred embodiment) makes it very hard to make out the image displayed on the image display layer 2 (the text in this preferred embodiment).

Figure 6A:
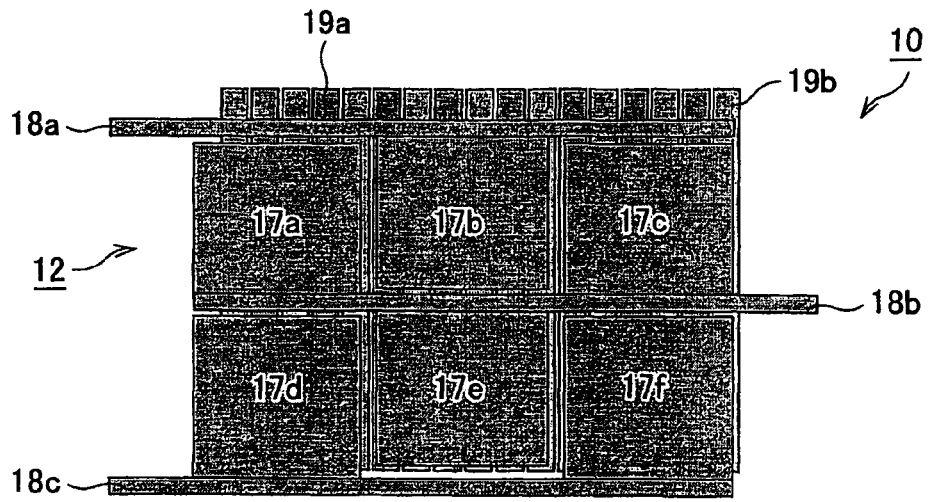
FIGS. 6A to 6D illustrate a directional display mode of the display of FIG. 2A.

FIG. 6A illustrates the display 1 in a 3-D display mode. FIG. 6A shows only the first and second patterned electrodes of the control element 8, and other components have been omitted for clarity. In this preferred embodiment, the stripe electrodes 19 of the second set of patterned electrodes are driven so as to provide a parallax optic, in this example, a parallax barrier, in the optical control element 8. This can be done by applying a first voltage to every alternate one of the stripe electrodes 19, and by applying a second, different voltage (which may be zero) to every other one of the stripe electrodes 19. At the same time, the addressing lines 18a-18c of the first set of patterned electrodes are connected to a uniform voltage, so that every one of the electrodes 17a-17f of the first set of patterned electrodes is at a uniform voltage. This creates a parallax barrier in the control element 8, which includes dark stripes 21 alternating with light stripes 22, as shown in FIG. 6D. The stripe electrodes thus enable a parallax barrier to be defined for a 3-D display mode.

Figure 6B:
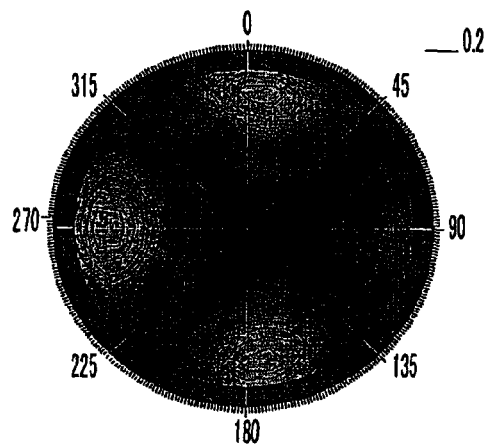
Figure 6C:
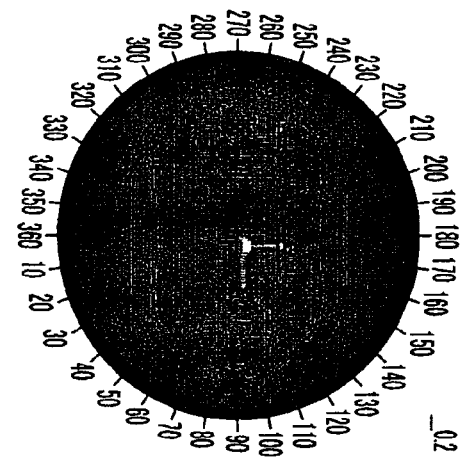
Figure 6D:
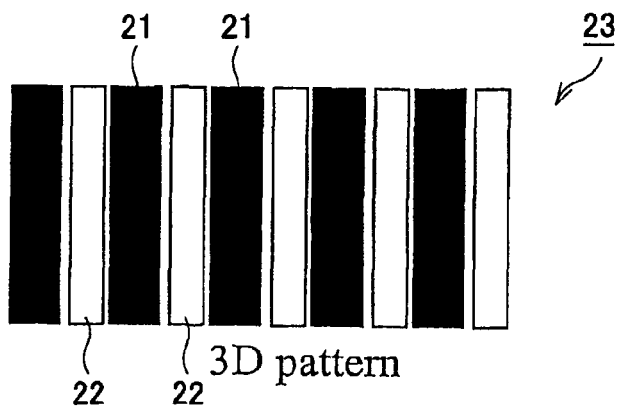

FIG. 6B is a plot of the transmissivity of a region of the control element 8 corresponding to a stripe electrode 19a to which the first voltage is applied. It can be seen that this region of the control element has a very low transmissivity when viewed along, or close to, the normal axis. FIG. 6C is a plot of the transmissivity of a region of the control element 8 corresponding to a stripe electrode 19b to which the second voltage is applied, and this shows that this region of the control element has a high transmissivity when viewed along the normal axis. The control element thus creates a parallax barrier including dark stripes 21 alternating with light stripes 22, as shown in FIG. 6D, in directions along or close to the normal axis. Although FIG. 6B has a slightly different form from FIG. 6C, both figures are plots of the transmissivity of the control element.

In most applications of the display, the opaque regions of the parallax barrier in the 3-D display mode are required to be visible in directions near the normal axis. This means that the liquid crystal state required to create the opaque regions of the parallax barrier is not the same as the liquid crystal state required to create the opaque regions of the obscuring pattern in the narrow display mode (which, as explained above, are not visible along the normal axis). This in turn means that the electric field required across the liquid crystal layer to create the opaque regions of the parallax barrier is not the same as the electric field required to create the opaque regions of the obscuring pattern in the narrow display mode. Depending on the liquid crystal mode, the electric field required to create the opaque regions of the parallax barrier may be either greater than or lower than the electric field required to create the opaque regions of the obscuring pattern in the narrow display mode.

In a display where the transmission axis of the exit polarizer 14 of the control element is perpendicular to the transmission axis of the exit polarizer 6 of the display device 7, the liquid crystal state in the regions of the liquid crystal layer 11 of the control element that form the transmissive regions of the parallax barrier preferably rotates the plane of polarization of light propagating along the normal axis by substantially 90°. The liquid crystal state in the regions of the liquid crystal layer 11 of the control element that form the opaque regions of the parallax barrier preferably have substantially no effect on the plane of polarization of light propagating along the normal axis, and this creates opaque regions visible at angles near normal incidence.

In a case where the liquid crystal layer of the control element 8 includes a nematic liquid crystal in a Freedericksz alignment, the wide display mode occurs in the absence of any electric field applied across the liquid crystal layer, as stated above. Application of a first voltage to alternate electrodes 17a, 17c, 17e of the first set of patterned electrodes (while applying another voltage (different from the first voltage) to the other electrodes of the first set of patterned electrodes or to the stripe electrodes 19) will produce the narrow display mode. Application of a second voltage, different from the first voltage, to alternate stripe electrodes 19 (while applying the said another voltage to the other stripe electrodes 19 or to the first set of patterned electrodes) will produce the 3-D display mode.

In the example of a display in which the liquid crystal layer of the control element 8 includes a nematic liquid crystal in a Freedericksz alignment or a vertical alignment disposed between cross linear polarizers, the narrow display mode is obtained by causing the liquid crystal molecules in some regions of the liquid crystal layer of the control element to adopt the partially switched state, whereas liquid crystal molecules in other regions of the liquid crystal layer of the control element are oriented parallel to the substrates and at 45° relative to the transmission axes of the polarizers. This generates the "confusing image" at high viewing angles. To obtain a directional display mode, the liquid crystal molecules in some regions of the liquid crystal layer of the control element are caused to adopt the fully switched state in which they are perpendicular to the plane of the substrates, to define the opaque regions of the parallax barrier. Liquid crystal molecules in other regions of the liquid crystal layer of the control element are oriented parallel to the substrates and at 45° relative to the transmission axes of the polarizers, to define the transmissive regions of the parallax barrier.

In order to obtain a good 3-D display mode, it is necessary for the dark regions 21 of the parallax barrier 23 to have as low a transmissivity as possible. It may therefore be advantageous to include one or more retarders or one or more optical compensator layers in the control element 8, in order to obtain an achromatic, low transmissivity dark state for the dark regions 21 of the parallax barrier 23.

Figure 7:
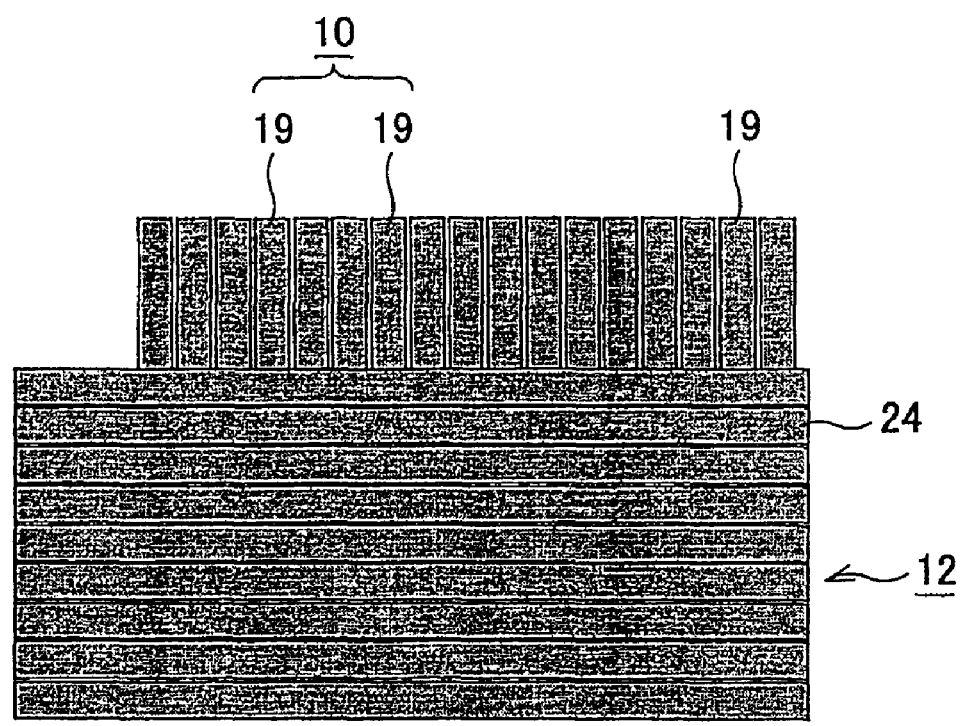
FIG. 7 is a schematic partial view of a display according to another preferred embodiment of the present invention.

FIG. 7 illustrates a display according to a modification of the preferred embodiment of FIG. 2A. FIG. 7 shows only the first and second sets of patterned electrodes 10, 12, and other components of the display have been omitted for clarity (and correspond to the components described above with reference to FIG. 2A). In this preferred embodiment, the second set 10 of patterned electrodes includes stripe-shaped electrodes 19 that are arranged generally parallel to one another. In this preferred embodiment, the first set of patterned electrodes 12 also includes an array of stripe-shaped electrodes 24 arranged generally parallel to one another and having a general uniform thickness over their length. The stripe electrodes 24 of the first set of patterned electrodes extend generally perpendicularly to the stripe electrodes 19 of the second set of patterned electrodes. In the display shown in FIG. 7, the stripe electrode 24 of the first set of patterned electrodes extend generally horizontally when the display is in its normal orientation, and the stripe electrode 19 of the second set of patterned electrodes extend generally in the vertical direction when the display is in its normal orientation.

In this preferred embodiment, the wide display mode may be obtained by applying a first voltage to each of the electrodes 24 of the first set of patterned electrodes 12, and by applying a second voltage to each of the stripe electrodes 19 of the second set of patterned electrodes 10 so as to obtain a uniform electric field (which, depending the liquid crystal mode, may be zero or non-zero) across the liquid crystal layer. A wide display mode is then obtained as described with reference to FIG. 3A above. Similarly, a 3-D display mode may be obtained by applying a first voltage to each of the stripe electrodes 24 of the first set of patterned electrodes, by applying a second voltage to every alternate stripe electrode 19 of the second set of patterned electrodes, and by applying a third voltage different from the second voltage to every other of the stripe electrodes 19 of the second set of patterned electrodes. A parallax barrier is then set up as described above with reference to FIG. 6A. The stripe electrodes 19 of the second set of patterned electrodes thus enable a parallax barrier to be defined for a 3-D display mode. As also described above, the magnitudes of the voltages required to obtain the wide display mode and the 3-D display mode will depend on the nature of the liquid crystal layer 11 of the control element 8.

In order to obtain a narrow display mode, the first and second sets of patterned electrodes are driven in order to define an "obscuring image" in the liquid crystal layer 11. Essentially, a pixel is defined in the liquid crystal layer 11 of the control element at every location where one of the stripe electrodes 24 of the first set of electrodes 12 overlaps one of the strip electrodes 19 of the second set of electrodes, and these pixels may be driven to be either transmissive or in an intermediate state that appears opaque to an off-axis viewer. The first and second sets of electrodes 10, 12 may be driven using any standard "passive matrix addressing" technique to drive the liquid crystal layer 11; such addressing techniques are well-known, and will not be described here. The stripe electrodes 24 of the first set of patterned electrodes 12 thus act as a patterned counter electrode that can obtain a narrow display mode.

In this preferred embodiment, the electric field applied across a region of the liquid crystal layer 11 of the control element to define an opaque region of the parallax barrier will again be different from (in general, greater than) the electric field applied across a region of the liquid crystal layer 11 of the control element to define an opaque region of the obscuring image in the narrow display mode.

The preferred embodiment of FIG. 7 has the advantage that any type of pattern or image may be used as the obscuring image, and the display 1 is not restricted to the use of one particular obscuring image. One advantage of this is that, as can be seen in FIG. 5D, the effectiveness of a checkerboard pattern at obscuring text depends on the relative size of the squares of the checkerboard pattern to the characters of the text. The preferred embodiment of FIG. 7 would allow the size of the squares of the checkerboard pattern to be chosen based on knowledge of the character size of a text image to be displayed on the image display layer 2. Yet another different pattern may be selected if the display layer 2 is primarily displaying graphical images or photographs. Further, the obscuring pattern may be selected based on the nature of an image being displayed on the image display layer 2, in order to give the most effective privacy effect.

In principle, a display having first and sets of patterned electrodes as shown in FIG. 2B could provide an obscuring pattern that could be varied depending on the nature of an image being displayed on display layer 2. For example, if the electrodes 17a-17f of the first set of patterned electrodes are individually addressable, the size of the opaque and transmissive regions of the checkerboard pattern may be varied, for example by driving the electrodes in 2×2 groups, 3×3 groups etc. This would allow the size of the squares of the checkerboard pattern to be chosen based on knowledge of the character size of a text image to be displayed on the image display layer 2.

Alternatively, the preferred embodiment of FIG. 7 allows use of a "moving" obscuring image—that is, an obscuring image that varies over time. This can increase the privacy of a displayed image, by making it harder for an observer outside the narrow viewing range 16 to decipher an image displayed on the image display layer 2.

The preferred embodiment of FIG. 7 may also use, for example, an advertising message or other message conveying information as the "obscuring image".

The preferred embodiment of FIG. 7 may be used to provide an alternative form of a parallax barrier, namely the slanted or staggered type as is known in the art. Such a barrier has transmissive apertures with boundaries that are inclined, rather than parallel, with respect to the boundaries of the underlying pixel of the image display layer 2. The advantage is that resolution in each image may be more evenly distributed between horizontal and vertical directions. Also the stripes of the barrier may appear less visible to a user.

Figure 8A:
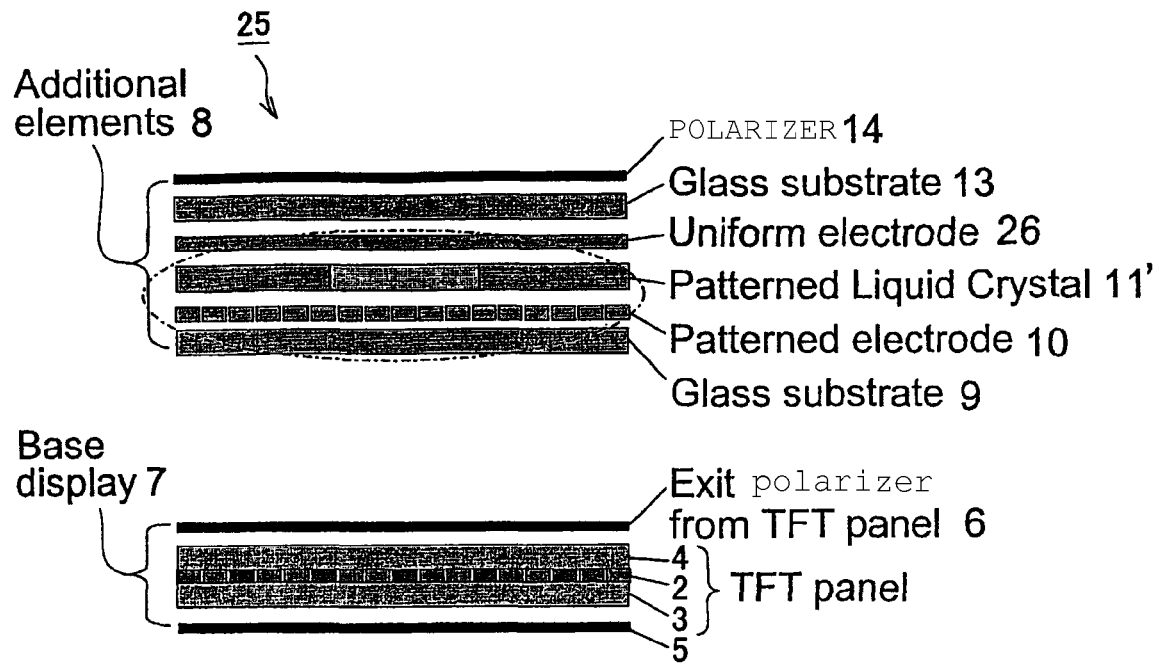
FIG. 8A is a plan sectional view of a display according to a further preferred embodiment of the present invention.

FIG. 8A is a schematic plan sectional view of a display 25 according to a further preferred embodiment of the present invention. The display 25 includes a control element 8 disposed in front of a transmissive image display device 7. The image display device 7 corresponds to the image display device 7 of the display 1 of FIG. 2A, and its description will not be repeated here.

The control element 8 includes a layer of electro-optic material, in this example, a liquid crystal layer 11', disposed between first and second transparent substrates 9, 13, (for example, glass substrates). Electrodes for addressing the liquid crystal layer 11' are provided between the first substrate 9 and the liquid crystal layer 11', and between the liquid crystal layer 11' and the second substrate 13. Finally, the control element 8 includes an exit polarizer 14. Other components, such as a controller for applying voltages to the electrodes and alignment films, have been omitted for clarity.

In the preferred embodiment of FIG. 2A, the liquid crystal layer 11 of the control element 8 had a uniform liquid crystal alignment over its entire area. In the preferred embodiment of FIG. 8A, however, the liquid crystal layer 11' does not have a uniform liquid crystal alignment over its entire area, but has a patterned alignment. As a result, this preferred embodiment requires only one set of patterned electrodes, to define the parallax barrier in the liquid crystal layer, and one of the sets of patterned electrodes of the display 1 of FIG. 2A may be replaced by a uniform electrode 26. In the display 25 of FIG. 8A, the uniform electrode 26 takes the place of the first set 12 of patterned electrodes 17a-17f of the display of FIG. 2A.

Figure 8B:
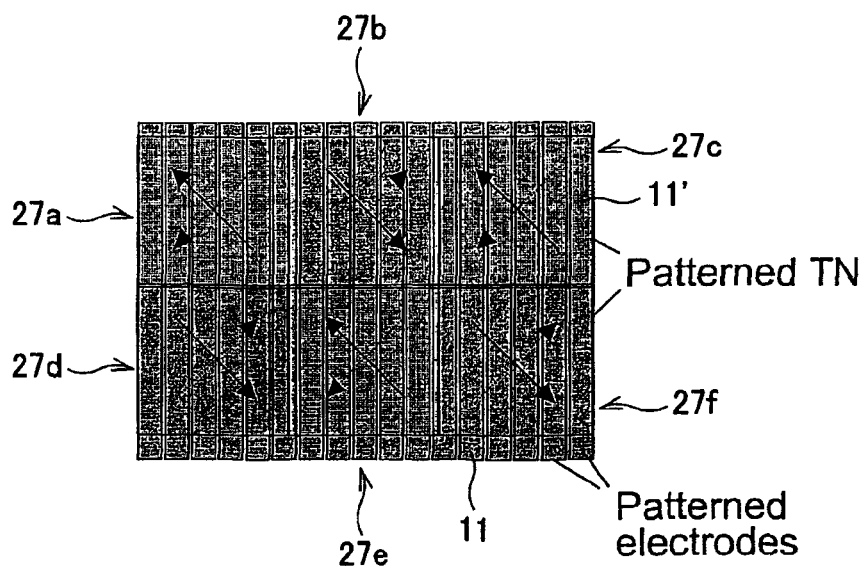
FIG. 8B is a perspective view of the display of FIG. 8A.

FIG. 8B is a plan view showing the liquid crystal layer and the patterned electrodes 19, looking from the position of an observer. Other components of the control element have been omitted. In this preferred embodiment, the liquid crystal layer 11' is patterned into a plurality of liquid crystal layer regions 27a-27f. The liquid crystal layer regions are arranged in a matrix of rows and columns so that a checkerboard obscuring image can be obtained. The liquid crystal layer is patterned in that the stable liquid crystal alignment, under zero applied electric field, varies between one region and an adjacent region in a column or row.

In this preferred embodiment, the liquid crystal layer 11' includes a twisted nematic liquid crystal material, in which the projection of liquid crystal molecules adjacent the first substrate 9 onto the first substrate makes a non-zero twist angle α (with the projection of liquid crystal molecules adjacent the second substrate 13 onto the second substrate. In this preferred embodiment, the twist angle α is approximately 90°. In FIG. 8B, the full arrow represents the alignment direction of liquid crystal molecules adjacent to the first substrate 9, and the broken arrow represents the direction of liquid crystal molecules adjacent to the second substrate 13. It can be seen that the alignment direction for one region 17a is at 180° relative to the alignment direction of a neighboring region 17b in a row or a neighboring region 17d in a column, which applies to both the alignment direction adjacent to the first substrate 9 and to the alignment direction adjacent to the second substrate 13.

At least 1-2 degrees pre-tilt of the liquid crystal molecules is needed to break the degeneracy of possible liquid crystal configurations which would otherwise reduce contrast, as is known in the art. Following convention, the arrowheads in FIG. 8B indicate a pre-tilt direction, and so it can be seen that different regions of the liquid crystal layer will have pre-tilt of an opposite sign (i.e., the alignment direction is different by 180 degrees from one region to another).

FIG. 8B also shows the patterned electrodes 10. These correspond to the second patterned electrodes 10 of FIG. 2A, and include an array of stripe electrodes 19 that are arranged to extend generally vertically when the display is in its normal orientation.

The liquid crystal layer alignment shown in FIG. 8B may be obtained by use of one or more patterned alignment surfaces (not shown in FIG. 8A). Each patterned aligning surface induces an alignment in adjacent liquid crystal molecules that is not uniform over the area of the aligning surface but that spatially varies across the surface so that regions 27a, 27b having different liquid crystal configurations, and hence different optical properties, may be obtained. For example, the patterned alignment surfaces may be arranged so as to provide regions of twisted nematic liquid crystal alignment, with different orientations of twist as shown in FIG. 8B.

A patterned alignment surface may be achieved by any known or suitable technique, for example, multiple rubbing techniques (where an alignment layer is rubbed, and is subsequently selectively masked and re-rubbed) by multiple evaporation of SiOx or by use of a photo-alignment technique. The production of a patterned alignment surface does not form part of the present invention, and will therefore not be described in detail.

Figure 9A:
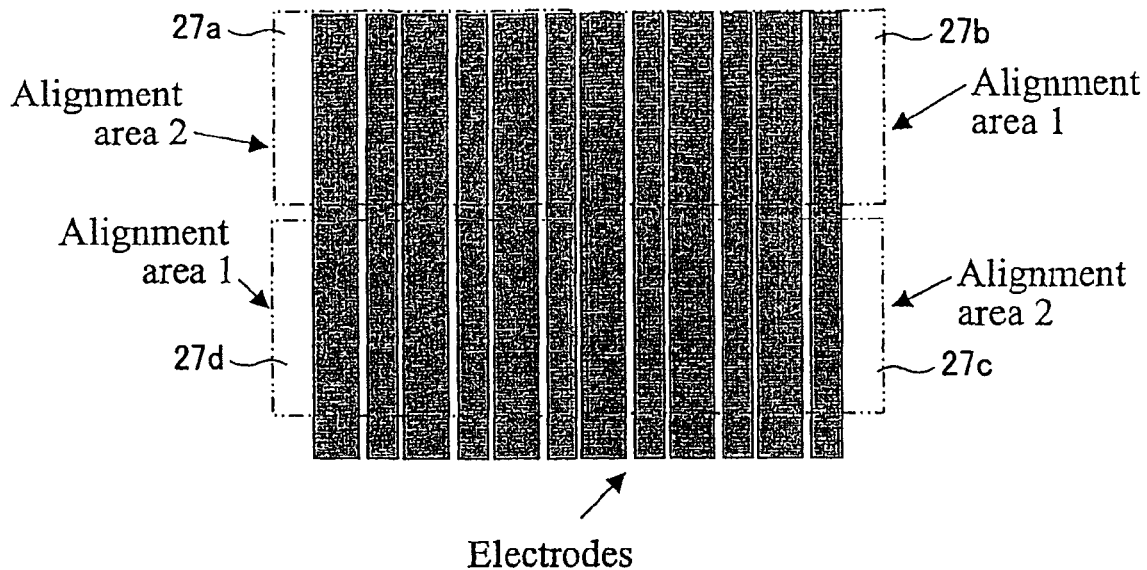
FIGS. 9A to 9C illustrate operation of the display of FIG. 8A.
Figure 9B:
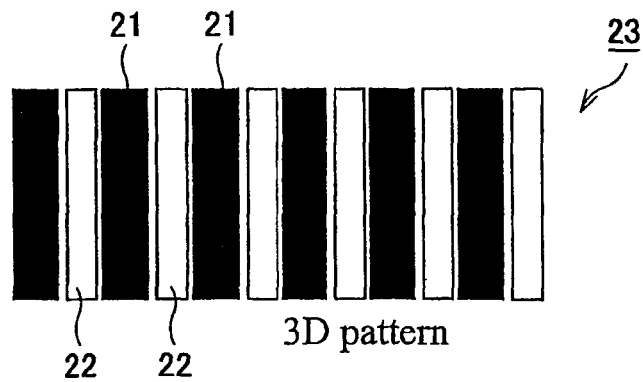
Figure 9C:
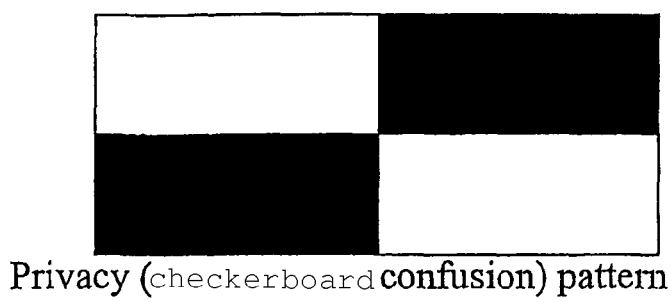

FIGS. 9A to 9C illustrate the general principle of this preferred embodiment of the present invention. FIG. 9A corresponds generally to FIG. 8B, but shows only four of the liquid crystal regions, including 27a, 27b, 27d and 27e. Of these, regions 27a and 27e have one liquid crystal alignment, and regions 27d and 27b have a different liquid crystal alignment.

FIG. 9B illustrates generation of a parallax barrier by applying suitable voltages to the stripe electrodes 19 of the set of patterned electrodes. As before, a parallax barrier is obtained by applying a first voltage to every alternate stripe electrode 19 of the set of patterned electrodes, by applying a second, different voltage to every other stripe electrode 19, and by applying a third voltage, different from at least one of the first and second voltages, to the uniform electrode 26. In the simplest implementation, the second and third voltages are equal to one another, and may both be zero.

FIG. 9C illustrates an "obscuring pattern" that can be provided by the liquid crystal layer 11'. This includes light regions and dark regions, with the light regions corresponding to the regions 27a, 27e of one liquid crystal alignment and the dark regions corresponding to regions 27d, 27b of the other liquid crystal alignment. In this preferred embodiment, the confusing pattern arises from the patterned alignment of the liquid crystal layer, rather than from use of a patterned electrode.

Figure 10A:
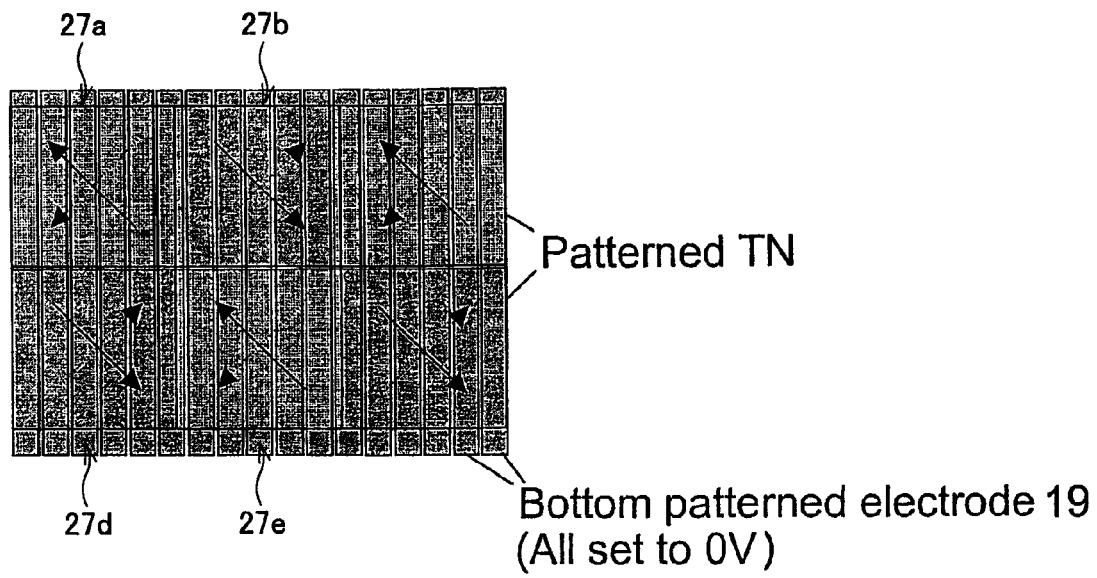
FIGS. 10A to 10C illustrate a wide display mode of the display of FIG. 8A.
Figure 10B:
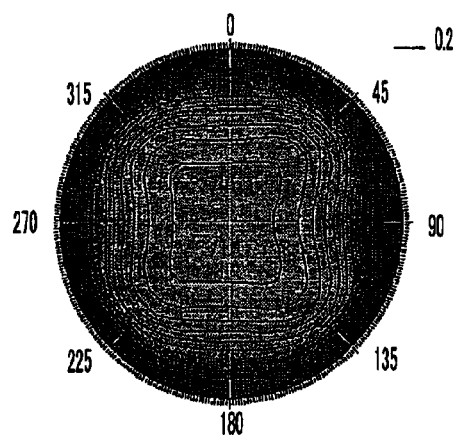
Figure 10C:
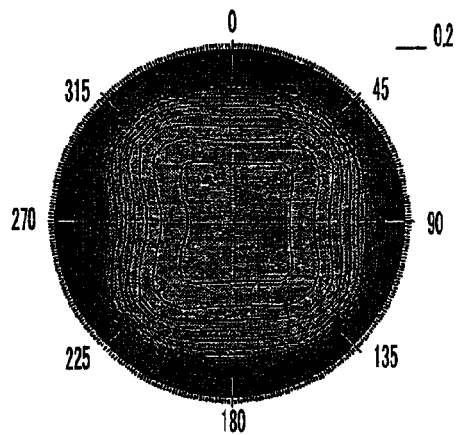

FIGS. 10A to 10C illustrate the wide display mode of the display 25 of this preferred embodiment. In this mode, the stripe electrodes 19 of the set of patterned electrodes 10 are all maintained at a uniform voltage. In the particular case of a twisted nematic crystal material, the wide display mode may be obtained by applying a voltage to every of the stripe electrodes 19, and also by applying the same voltage to the uniform counter electrode 26. In this case, a region 27a having one liquid crystal alignment and a region 27b having the other liquid crystal alignment produce substantially the same optical properties as one another, and preferably both provide high transmissivity. In a preferred embodiment, both liquid crystal alignments rotate the plane of polarization of light by substantially 90°, and the exit polarizer 14 of the control element 8 has its transmission axis perpendicular to the transmission axis of the exit polarizer 6 of the display device 7.

FIG. 10B is a plot of transmissivity, in the wide display mode, of a region 27b, 27d of the control element 8 in which the liquid crystal layer 11' has one liquid crystal alignment, and FIG. 10C shows a transmissivity plot, in the wide display mode, for a region 27a, 27e of the control element 8 having the other liquid crystal alignment. As can be seen, both intensity plots show a high intensity for an observer viewing the display along its normal axis, and also show that the intensity remains high as the observer moves laterally away from the normal axis, on either side of the normal axis. Thus, an image displayed on the image display layer 2 is visible over a wide viewing angle range, such as the wide viewing angle range 15 indicated in FIG. 2A.

Figure 11A:
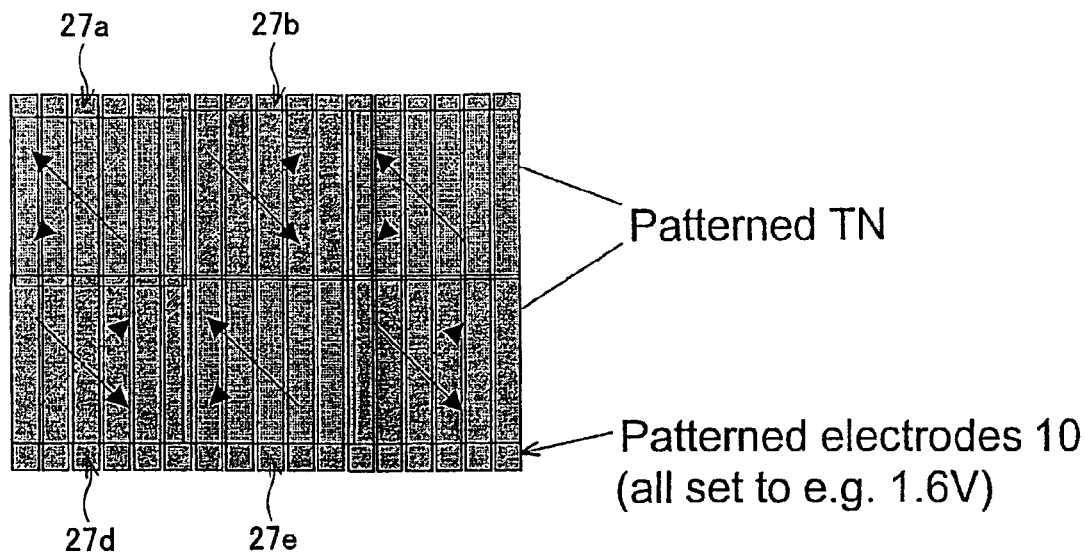
FIGS. 11A to 11C illustrate a narrow display mode of the display of FIG. 8A.

FIG. 11A illustrates a narrow view mode of the display 25. In this mode, the stripe electrodes 19 of the set 10 of patterned electrodes are again all set at a uniform voltage. However, the voltage applied to the stripe electrodes 19 in this mode is sufficiently large to re-orient the liquid crystal molecules and cause them to adopt a different liquid crystal state.

Figure 11B:
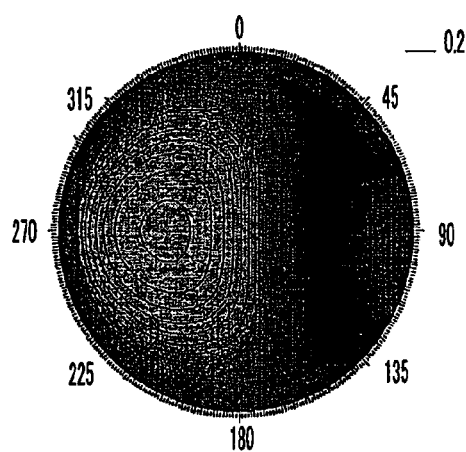
Figure 11C:
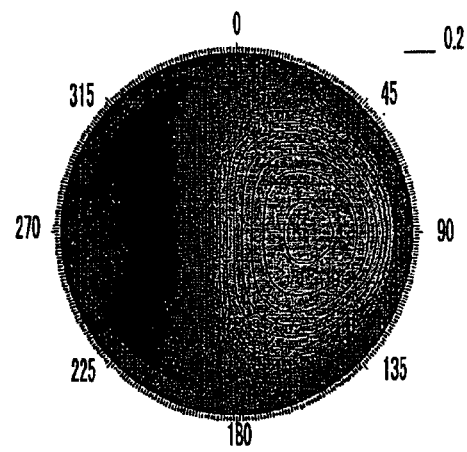

FIG. 11B is a plot of transmissivity, in the narrow display mode, of a region 27b, 27d of the control element 8 having the first liquid crystal alignment, and FIG. 11C is a plot of transmissivity, in the narrow display mode, of a region 27a, 27e of the control element 8 having the second liquid crystal alignment. As can be seen from FIG. 11B, a region 27b, 27d having a first liquid crystal alignment appears light to a viewer who is looking at the display along its normal axis or who is positioned to the left of the normal axis, but appears dark to a viewer who is positioned to the right of the normal axis of the display. Conversely, FIG. 11C shows that a region 27a, 27e of the liquid crystal layer 11' having the second liquid crystal alignment appears light to a viewer viewing the display along the normal axis or who is positioned to the right of the normal axis, but appears dark to a viewer positioned to the left of the normal axis. A viewer who is viewing the display along the normal axis, or within a narrow viewing range around the normal axis such as the viewing range 16 in FIG. 2A will therefore be able to make out an image displayed on the image display layer 2, since all regions of the control element appear bright to such a viewer, they will not perceive any "obscuring image".

A viewer who is viewing the display from a viewing angle outside the narrow viewing angle range 16 will, however, perceive the checkerboard "obscuring pattern". If the viewer is to the left of the normal axis, the regions of the control element corresponding to the regions 27b, 27d of the first liquid crystal alignment will appear light and the regions of the control element corresponding to regions 27a, 27e having the second liquid crystal alignment will appear dark, whereas a viewer viewing the display from a viewing angle that is to the right of the normal axis will perceive the regions of the first liquid crystal alignment as dark and regions of the second liquid crystal alignment as light. In either case, the viewer will see the checkerboard pattern overlaid on the image displayed on the image display layer, and the checkerboard pattern will obscure the image as explained above. An image displayed on the image display layer 2 will therefore be readable only by an observer disposed within the narrow range 16 of viewing angles.

Figure 12A:
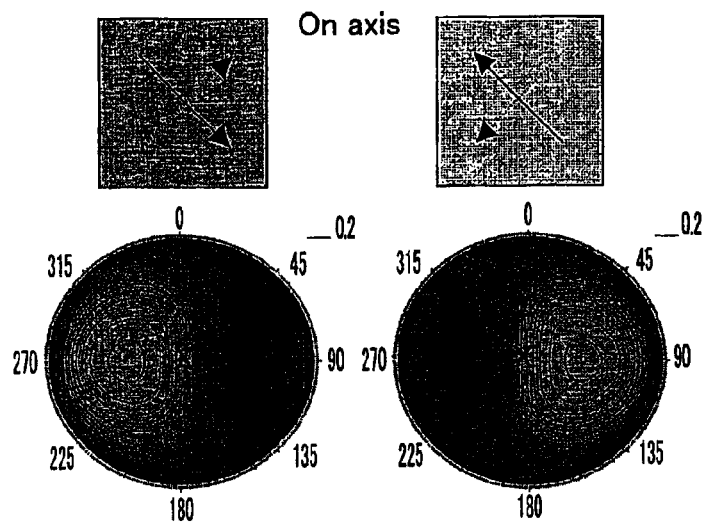
FIGS. 12A to 12C further illustrate the narrow viewing mode of the display of FIG. 8A.
Figure 12B:
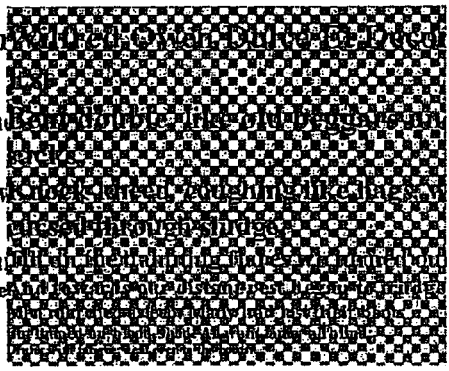
Figure 12C:
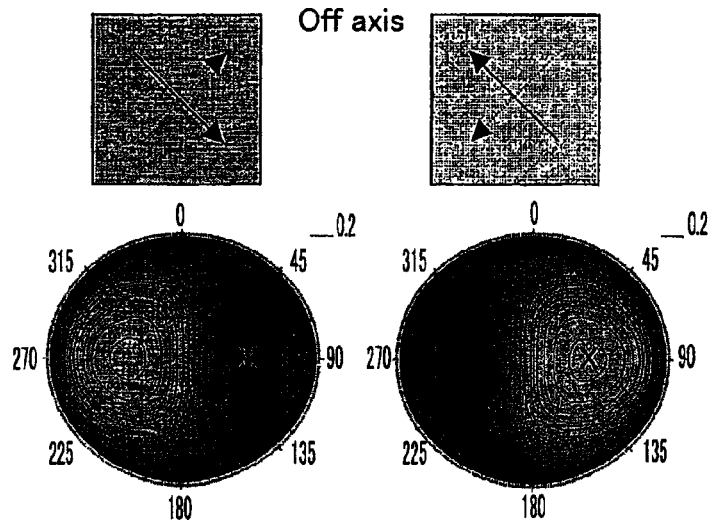

FIGS. 12A to 12C further illustrate operation of the display 25 in its narrow view mode. FIG. 12A shows two plots of transmissivity of the control element in the narrow display mode, the left plot being for a region of the control element in which the liquid crystal layer 11' has the first liquid crystal alignment and the right hand intensity plot being for a region of the control element 8 in which the liquid crystal layer 11' has the second liquid crystal alignment. The position of an observer viewing the display along its normal axis is marked on the intensity plots by an "X" and it can be seen that the two regions of the control element have substantially the same transmissivity as one another for this observer. An observer viewing the display along its normal axis will therefore not see the obscuring image, and will see only the original image displayed on the image display layer 2, as shown in the left hand part of FIG. 12B, which represents the view seen by an observer. The image displayed on the image display layer 2 is thus seen clearly.

FIG. 12C shows two transmissivity plots corresponding to those of FIG. 12A, but the position of an off-axis observer is marked using an "X". It can be seen that a region of the control element 8 in which the liquid crystal layer 11' has the first liquid crystal alignment appears dark to this observer, whereas a region of the control element in which the liquid crystal layer 11' has the second liquid crystal alignment appears bright to this observer. As a result, the observer will perceive the checkerboard "obscuring image" superposed over the image from the image display layer 2. This is shown in the right hand portion of FIG. 12B. The right hand portion of FIG. 12B corresponds generally to the right hand portion of FIG. 5B, and further description will not be repeated.

Figure 13A:
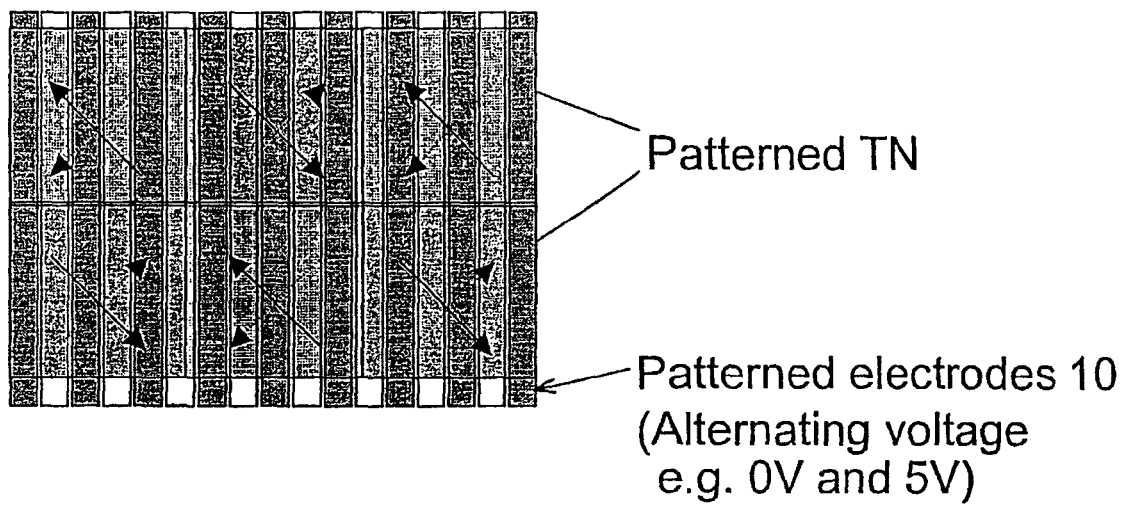
FIGS. 13A to 13C illustrate a directional display mode of the display of FIG. 8A.
Figure 13B:
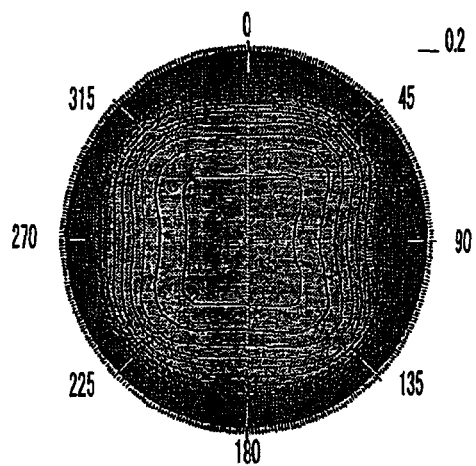
Figure 13C:
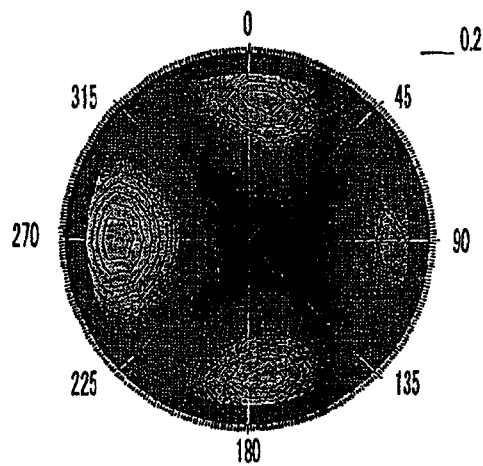

FIG. 13A to FIG. 13C illustrate the display 25 in its 3-D mode. This can be obtained by applying a first voltage to every alternate stripe electrode 19 of the set of patterned electrodes, and by applying a second, different voltage (which may be zero) to every other stripe electrode 19. This causes alternating light and dark stripe/shaped regions to be defined in the control element 8, thereby producing a parallax barrier.

Details of how liquid crystal states that provide low intensity off-axis (to provide the narrow display mode as in FIGS. 11B and 11C) or that provide low intensity on-axis (as in FIG. 13C, to provide the opaque regions of the parallax barrier) may be obtained using a TN liquid crystal material are contained in the above-mentioned UK Patent Application No. 0408742.5 and corresponding European Patent Application No. 05103193.8, to which attention is directed. In brief, however, at an intermediate applied voltage the liquid crystal molecules in the middle of the layer are tilted with respect to the liquid crystal plane resulting in an asymmetric angular distribution of transmitted light, due to the effective birefringence of the liquid crystal being tilted, as is well known in the art. The provision of a dark state for a fully switched TN is also well known in the art.

FIG. 13B is a plot of transmissivity for a region of the control element 8 corresponding to one of the light stripes of the parallax barrier. As can be seen, a high intensity is seen not only by an observer viewing the display along its normal axis but also by observers in a wide range of viewing angles, such as the wide viewing angle range 15 of FIG. 2A. FIG. 13C is a plot of transmissivity for a region of the control element 8 corresponding to one of the dark regions of the control element, and it can be seen that a very low intensity is obtained over a wide range of viewing angles, including the normal direction. The control element thus acts as a parallax barrier, and a 3-D display mode is obtained.

The preferred embodiments of the present invention have been described with reference to nematic liquid crystals, in particular to a Freedericksz aligned nematic liquid crystal, a vertically aligned nematic liquid crystal, or a twisted nematic liquid crystal material. The present invention is not, however, limited to these liquid crystal materials, and the control element 8 may include other liquid crystal modes. For example, the control element 8 may include a layer of, for example, a super twisted nematic liquid crystal material, a hybrid aligned nematic liquid crystal material, a twisted vertically aligned nematic liquid crystal material, a pi-cell alignment, a ferroelectric liquid crystal material, etc.

The preferred embodiment of FIG. 8A has been described with reference to a patterned liquid crystal layer that produces a checkerboard "obscuring image". The preferred embodiments are not, however, limited to this, and the liquid crystal layer may be patterned to provide any suitable "obscuring image" that, when overlaid on an image displayed on the image display layer 2, makes it difficult or impossible for a viewer to decipher the original image. As examples, the liquid crystal layer 11' of the display 25 may be patterned to produce an obscuring image in the form of text or a manufacturer's name.

Figure 14A:
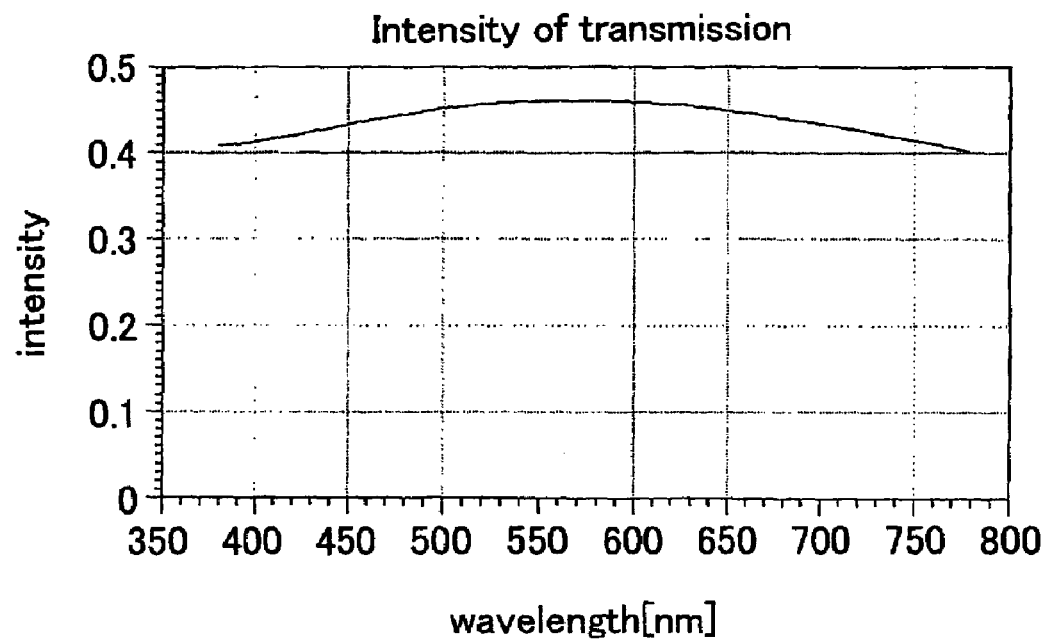
FIGS. 14A and 14B illustrate the wavelength dependence of transmission of the public display modes for the displays of FIGS. 8A and 2A, respectively.
Figure 14B:
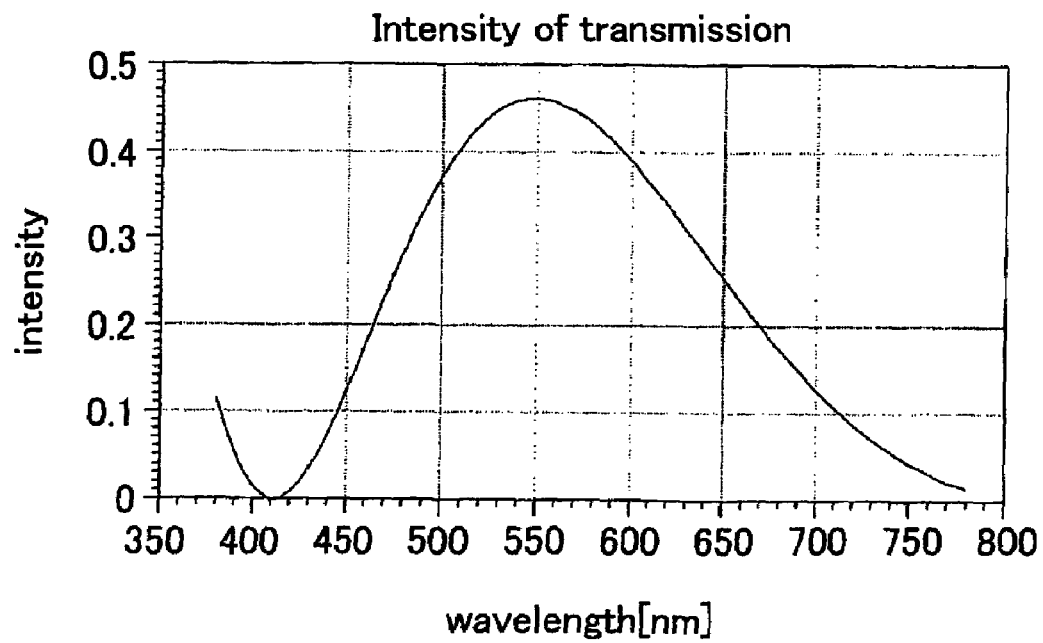

FIGS. 14A and 14B illustrate the wavelength dependence of transmissivity of the wide viewing mode for the embodiments of FIGS. 8A and 2A, respectively. It can be seen that although the preferred embodiment of FIG. 8A (in which the liquid crystal layer 11' of the control element 8 has a patterned alignment) has a transmissivity with a relatively low dependence on wavelength over the visible spectrum in its wide viewing mode, the preferred embodiment of FIG. 2A (in which the counter electrode 12 of the control element 8 is patterned) has a transmissivity in its wide viewing mode that is strongly wavelength-dependent. This strong wavelength-dependence of the wide viewing mode in the preferred embodiment of FIG. 2A arises because a relatively thick liquid crystal layer is required for the control element 8 in the preferred embodiment of FIG. 2A, and it leads to undesirable coloration of a displayed image in the public display mode.

The wavelength-dependence of the wide viewing mode in the preferred embodiment of FIG. 2A may be reduced by providing an optical retarder in the path of light through the liquid crystal layer 11 of the control element of FIG. 2A.

Figure 15:
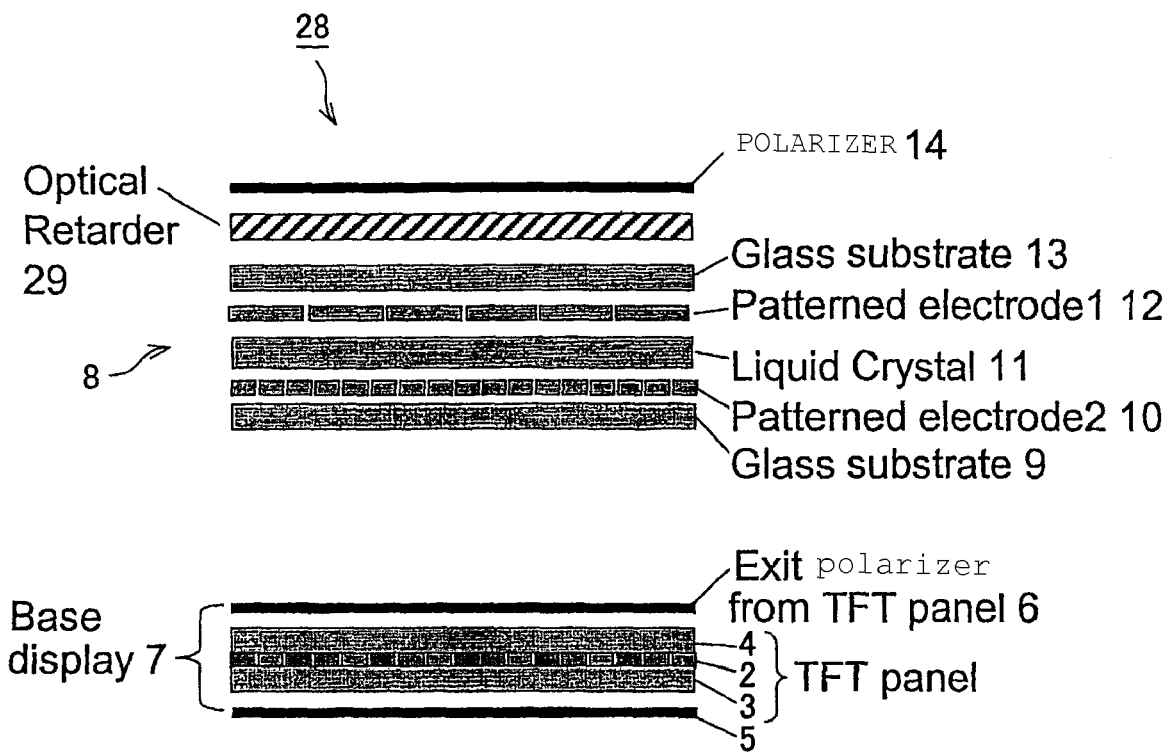
FIG. 15 is a plan sectional view of a display according to a further preferred embodiment of the present invention.

FIG. 15 is a schematic plan sectional view of a display 28 according to a further preferred embodiment of the present invention. The display 28 includes a control element 8 disposed in front of a transmissive image display device 7. The image display device 7 corresponds to the image display device 7 of the display 1 of FIG. 2A, and its description will not be repeated here.

The control element 8 includes a layer of electro-optical material 11, for example, a liquid crystal layer, disposed between third and fourth transparent substrates 9, 13, formed, for example, of glass. A first set of patterned electrodes 10 and a second set of patterned electrodes 12 are provided between the third and fourth glass substrates 9, 13, to enable to liquid crystal layer 11 to be addressed. These sets of electrodes correspond to the sets of patterned electrodes of the control element 8 of the display of FIG. 2A and so will not be described further. The control element 8 also includes an exit polarizer 14.

The display 28 of FIG. 15 further includes an optical retarder 29 provided to reduce the coloration of the display in its wide viewing mode. In FIG. 15, the retarder 29 is disposed within the control element 8, between the fourth substrate 13 and the exit polarizer 14. However, the retarder is not limited to this location, and the retarder may alternatively be disposed, for example, between the image display device 7 and the control element 8.

The retarder is preferably arranged with its optical axis substantially parallel to, or substantially perpendicular to, the alignment direction of the liquid crystal layer 11 of the control element 8.

Figure 16A:
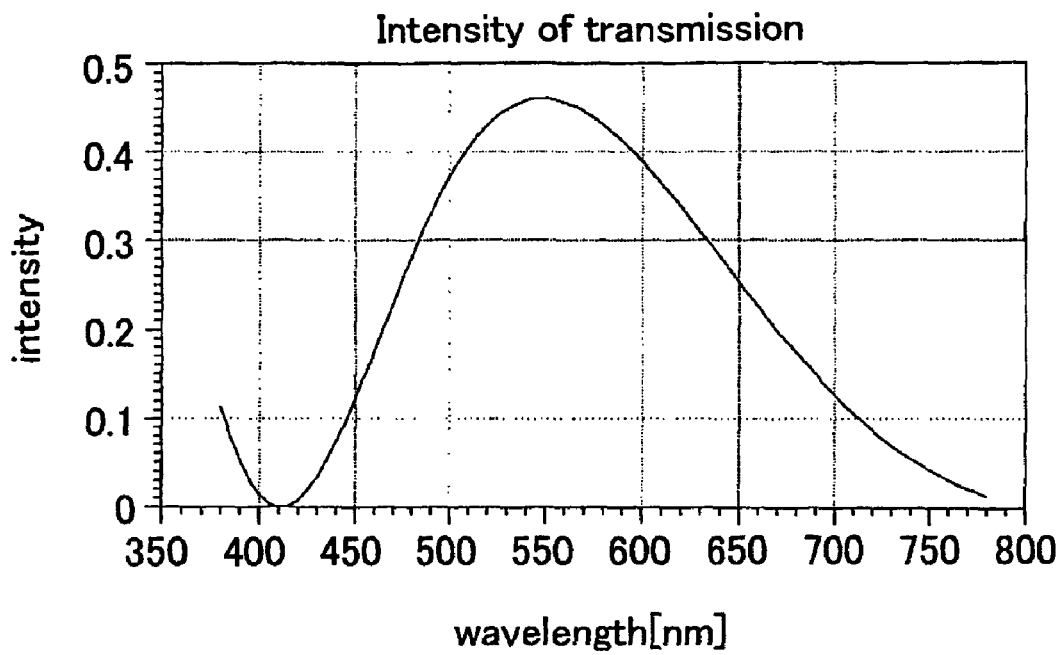
FIGS. 16A and 16B illustrate the wavelength dependence of transmission of the public display modes for the displays of FIGS. 2A and 15, respectively.
Figure 16B:
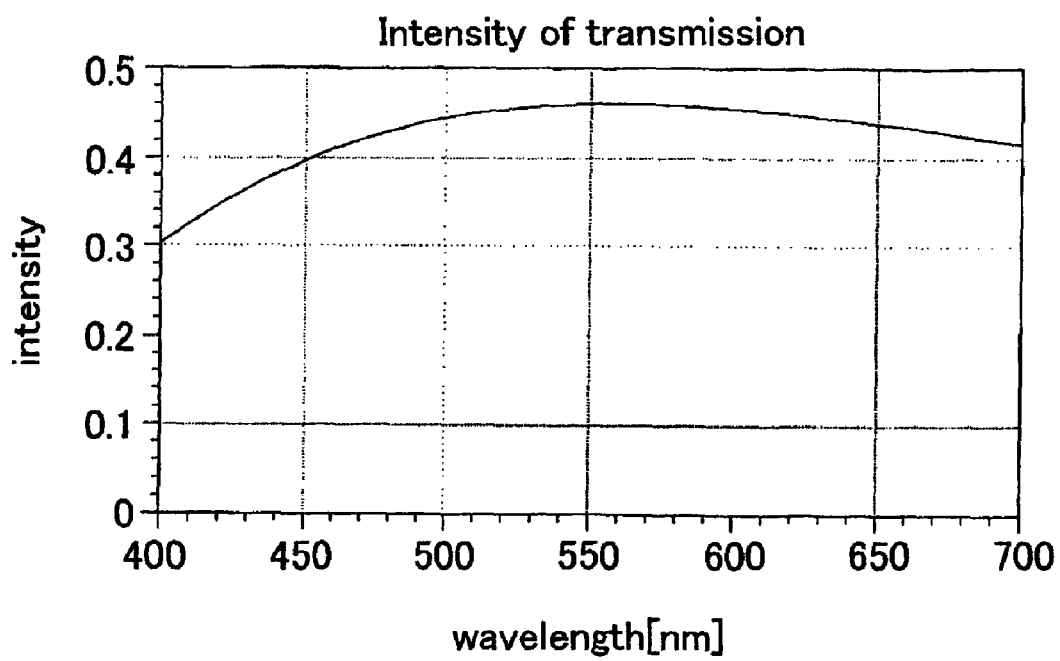

FIGS. 16A and 16B show the improvement provided by the embodiment of FIG. 15. FIG. 16A shows the wavelength dependence of transmissivity of the wide viewing mode for a display according to the preferred embodiment of FIG. 2A, for a case where the liquid crystal layer 11 of the control element 8 is an ECB liquid crystal layer. As noted above, the transmissivity in the wide viewing mode is strongly wavelength-dependent.

FIG. 16B shows the wavelength dependence of transmissivity of the wide viewing mode for a display according to the preferred embodiment of FIG. 15, again for a case where the liquid crystal layer 11 of the control element 8 is an ECB liquid crystal layer. As can be seen, providing the retarder 29 has significantly reduced the wavelength dependence of the transmissivity in the wide viewing mode.

Although FIGS. 16A and 16B shows the transmissivity for a display in which the control element has an ECB liquid crystal layer, similar results are obtained for displays in which the control element has, for example, a VAN liquid crystal layer.

The preferred embodiments of the present invention have been described with reference to a display that is operable in a 3-D display mode. The present invention is not, however, limited to the use of a 3-D display mode as the multiple view directional display mode, and the display of the present invention may alternatively be operable in a dual view mode.

The preferred embodiments of the present invention have been described with reference to a display incorporating a transmissive image display device 7. The present invention is not limited to a transmissive image display device 7, and a display of the present invention may have an emissive image display device, a reflective image display device, or a transflective image display device.

In the case of a display having a transmissive image display device, the control element 8 may be disposed in front of the image display device (i.e., between the image display device and an observer), or it may be disposed behind the image display device (i.e., between a backlight and the image display device). In the case of a display having an emissive display device or a reflective display device, the control element 8 is necessarily disposed in the path of light from the image display device to an observer.

Any of the preferred embodiments described herein may be arranged to provide an indication to a user of when the display is in the private or narrow viewing angle mode. For example, this may be provided within software which causes an image or icon to be displayed to show that the display is in the private mode. Such an icon may be overlaid, for example, on a displayed image at the bottom of the screen of the display, and may include the word 'private'. Alternatively, this function may be provided in the image display or in the additional components so that, when the display is switched to the private mode, a portion of the image display of the additional components is activated in order to display an appropriate icon.

The displays described herein may be combined with or provided in association with a device or arrangement which automatically switches the display to the private mode when the content of the image to be displayed is of the appropriate type. For example, if the display is used for viewing internet pages, any of the software flags associated with internet pages may be used to trigger the display so that it operates in the private mode. An example of such an application is when a browser is working in a secure encrypted mode, for example, when personal bank details are being viewed or when secure transactions are being conducted.

It is also possible to arrange for the display to switch to the private mode when the display is part of or is associated with a display for data entry and the type of data being entered or about to be entered is such that the private display mode is required. For example, the entering of a personal identification number ("PIN") may automatically cause the display to switch to the private mode. Such an arrangement may, for example, be used with "chip and pin" technology in retail trading outlets.

In many of the preferred embodiments described above, the narrow viewing angle range has been such that its bisector is parallel, or substantially parallel, to the normal axis of the display. In some applications, however, it may be desirable for the narrow viewing angle range to be such that its bisector is not parallel to the normal axis of the display. The feature may be desirable when the display is used in an automotive application, for example, in the dashboard of a vehicle. Such an arrangement could be used so that, in the narrow viewing angle mode, the passenger or driver is unable to view the displayed image. This may be achieved, for example, by using a display as shown in FIGS. 2A and 2B, in which the bisector of the narrow viewing angle range shown in FIG. 2A is not parallel to the normal axis of the display.

The displays described above may include an ambient light sensor, and may arrange for the display to switch to the private mode when the output from the ambient light sensor indicates that the level of ambient light has fallen below a pre-set threshold. This may be of use in, for example, a display in a vehicle, since the viewing angle of the display could be controlled in order to reduce the reflections of the display in the windscreen and the windows, so that, for example, the viewing angle could be reduced at nighttime or in low light conditions.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display switchable between a first display mode having a first viewing angle range, a second display mode having a second viewing angle range smaller than the first viewing angle range and a multiple view directional display mode; the display comprising:
   an image display layer; and
   a control element including a layer of electro-optical material; wherein
   the control element is switchable between: (i) first state in which the control element cooperates with the image display layer to provide the first display mode, (ii) a second state in which the control element cooperates with the image display layer to provide the second display mode, and (iii) a third state in which the control element cooperates with the image display layer to provide the multiple view directional display mode;
   the first display mode provides a first image to be seen from the first viewing angle range, the first image being displayed by the image display layer; and
   the second mode provides a second image to be displayed by the layer of electro-optical material at a position such that the second image is superposed over the first image, the second image is seen in ranges other than the second viewing angle range and is not seen in the second viewing angle range.

2. A display according to claim 1, wherein the control element further comprises at least one patterned electrode arranged to address the layer of electro-optical material and a controller arranged to address the at least one electrode thereby to put the control element into a desired one of the first state, the second state, and the third state.

3. A display according to claim 2, wherein the control element comprises a first set of patterned electrodes disposed on a first side of the layer of electro-optical material and a second set of patterned electrodes disposed on a second side of the layer of electro-optical material.

4. A display according to claim 3, wherein the first set of patterned electrodes is addressable to define the second image in the electro-optical layer such that the first image is visible at viewing angles outside the second viewing angle range and not visible at viewing angles inside the second viewing angle range.

5. A display according to claim 4, wherein the second set of patterned electrodes is addressable to selectively define a parallax optic in the electro-optical layer.

6. A display according to claim 3, wherein the first and second sets of patterned electrodes are addressable to cooperate to define the second image in the electro-optical layer such that the first image is visible at viewing angles outside the second viewing angle range and not visible at viewing angles inside the second viewing angle range.

7. A display according to claim 6, wherein the first image is selected dependent on a second image to be displayed by the image display layer.

8. A display according to claim 3, wherein the control element further comprises at least one patterned alignment surface arranged to align the electro-optical layer.

9. A display according to claim 8, further comprising a set of patterned electrodes disposed on one side of the layer of electro-optical material.

10. A display according to claim 9, wherein the set of patterned electrodes is addressable to selectively define a parallax optic in the electro-optical layer.

11. A display according to claim 8, wherein the electro-optical layer is addressable to define the second image in the electro-optical layer such that the first image is visible at viewing angles outside the second viewing angle range and not visible at viewing angles inside the second viewing angle range.

12. A display according to claim 2, wherein the display further comprises an optical retarder disposed in the path of light through the control element.

13. A display according to claim 2, wherein the layer of electro-optical material comprises a first layer of liquid crystal material.

14. A display according to claim 13, wherein the liquid crystal material is in a partially switched state when the control element is in the second state.

15. A display according to claim 13, wherein the liquid crystal material is a nematic liquid crystal material in a Freedericksz alignment.

16. A display according to claim 13, wherein the liquid crystal material is a vertically aligned nematic liquid crystal material.

17. A display according to claim 1, wherein the image display layer comprises a second layer of liquid crystal material.

18. A display according to claim 1, wherein the multiple view mode is a 3-D display mode.

19. A display according to claim 1, wherein the multiple view mode is a dual view display mode.

20. A display according to claim 1, wherein the second viewing angle range is within the first viewing angle range.

21. A display according to claim 1, wherein the second viewing angle range includes the normal direction.

22. A display according to claim 1, wherein the second viewing angle range has a bisector which is non-normal to the display.

23. A display according to claim 1, wherein the display is arranged to display an indication when the display is in the second display mode.

24. A display according to claim 1, wherein the display is arranged to adopt the second display mode in response to the content of data for display.

* * * * *